(12) United States Patent
Zhang et al.

(10) Patent No.: US 12,451,952 B2
(45) Date of Patent: Oct. 21, 2025

(54) SIGNAL TRANSMISSION METHOD AND COMMUNICATION APPARATUS

(71) Applicant: HUAWEI TECHNOLOGIES CO., LTD., Shenzhen (CN)

(72) Inventors: Peng Zhang, Reading (GB); Jiayin Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/473,348

(22) Filed: Sep. 25, 2023

(65) Prior Publication Data
US 2024/0014879 A1 Jan. 11, 2024

Related U.S. Application Data

(63) Continuation of application No. PCT/CN2022/082060, filed on Mar. 21, 2022.

(30) Foreign Application Priority Data

Apr. 2, 2021 (CN) .......................... 202110363861.6

(51) Int. Cl.
H04B 7/06 (2006.01)

(52) U.S. Cl.
CPC ..... *H04B 7/06964* (2023.05); *H04B 7/06958* (2023.05)

(58) Field of Classification Search
CPC .................. H04B 7/06964; H04B 7/06958
See application file for complete search history.

(56) References Cited

U.S. PATENT DOCUMENTS

| | | | |
|---|---|---|---|
| 2018/0279380 A1* | 9/2018 | Jung | ................. H04W 74/0838 |
| 2021/0083748 A1 | 3/2021 | Guan et al. | |
| 2021/0410130 A1* | 12/2021 | Rahman | ............. H04B 7/06968 |

FOREIGN PATENT DOCUMENTS

| | | | | |
|---|---|---|---|---|
| CN | 106612559 A | | 5/2017 | |
| WO | WO-2019191753 A1 | * | 10/2019 | ............ H04W 72/20 |
| WO | WO-2021186212 A1 | * | 9/2021 | ......... H04L 25/0224 |

OTHER PUBLICATIONS

3GPP TS 38.133, "3rd Generation Partnership Project; Technical Specification Group Radio Access Network; NR; Requirements for Support of Radio Resource Management (Release 17)", 3GPP Organizational Partners, V17.0.0, Dec. 2020, 1630 pages.

* cited by examiner

*Primary Examiner* — Freshteh N Aghdam
(74) *Attorney, Agent, or Firm* — Maier & Maier, PLLC

(57) ABSTRACT

A signal transmission method and a communication apparatus, to resolve a problem that an analog beam configuration switching process affects receiving and sending of a normal signal. The method includes: a terminal device receives first information from a network device, where the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal. The terminal device sends or receives a signal based on the first information, where the second-type signal is carried on a time domain resource other than N time domain units before and/or after the first time domain resource.

15 Claims, 10 Drawing Sheets

SIGNAL TRANSMISSION METHOD AND COMMUNICATION APPARATUS

CROSS-REFERENCE TO RELATED APPLICATIONS

This application is a continuation of International Application No. PCT/CN2022/082060, filed on Mar. 21, 2022, which claims priority to Chinese Patent Application No. 202110363861.6, filed on Apr. 2, 2021. The disclosures of the aforementioned applications are hereby incorporated by reference in their entireties.

TECHNICAL FIELD

Embodiments relate to the field of communication technologies, and to a signal transmission method and a communication apparatus.

BACKGROUND

With popularization of intelligent terminals and continuous growth of new mobile service requirements, a required wireless transmission rate grows exponentially, and spectrum resources become more strained. In an existing idea, use of high-band spectrum resources is proposed. Because, in a higher frequency band, penetration of an electromagnetic wave is poor, and energy attenuation is large, a high path loss is caused. To counteract a path loss, a network device and a terminal device use a large antenna array to improve power and spectral efficiency. Dozens or even hundreds of antennas are configured in a coverage area of the network device, and these antennas are centrally placed in a large-scale array manner. A plurality of terminal devices distributed in the coverage area of the network device simultaneously communicate with the network device on a same time-frequency resource based on a spatial degree of freedom provided by a large-scale antenna configuration of the network device, thereby greatly improving spectrum resource utilization. A beamforming (BF) solution is applied to a network device and a terminal device in a large antenna array scenario, that is, a beamforming technology pointing to a terminal device is used to implement transmission coverage of a corresponding terminal device. The beamforming solution may be classified into a digital beamforming solution and an analog beamforming solution based on whether a weight vector and a weight matrix or a precoding vector and a precoding matrix are used for a baseband or a radio frequency.

To further improve spectral efficiency, different beam configurations are usually used to receive and/or send different types of signals. The beam configuration may include a beam width, a beam direction, or the like. For example, the network device sends a broadcast-type signal through a wide beam. For another example, the network device sends a data signal through a narrow beam.

Because different types of signals correspond to different beam configurations, when a type of a transmitted signal changes, a beam configuration also needs to be adaptively switched. A beam configuration switching process takes some time, and the network device cannot send any signal in the beam configuration switching process. Similarly, it also takes some time for the terminal device to switch the beam configuration. If the beam configuration switching process takes an excessively long time, resources of a normal signal may be occupied, affecting receiving and sending of the normal signal.

SUMMARY

Embodiments provides a signal transmission method and a communication apparatus to resolve a problem that an analog beam configuration switching process affects receiving and sending of a normal signal.

According to a first aspect, a signal transmission method is provided. The method may be performed by a terminal device or may be performed by a component (for example, a processor, a chip, or a chip system) in a terminal device. The method is described by using a terminal device as an example. The method may be implemented by using the following steps: the terminal device receives first information from a network device, where the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal. The terminal device sends or receives a signal based on the first information, where the second-type signal is carried on a time domain resource other than N time domain units before and/or after the first time domain resource. The terminal device does not expect the second-type signal to be carried on the N time domain units before and/or after the first time domain resource, where N is a positive integer.

The terminal device does not expect the second-type signal to be carried on the N time domain units before and/or after the first time domain resource. This can restrict the terminal device from not receiving the second-type signal or not receiving any signal on the N time domain units before and/or after the first time domain resource. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

The following describes some possible implementations of the first aspect.

In a possible implementation, the terminal device expects to send or receive a third-type signal on the N time domain units, where a third beam configuration of the third-type signal is the same as the first beam configuration. When a signal with the third beam configuration that is the same as the first beam configuration is sent on the N time domain units, a same beam configuration may be used on the N time domain units, and no beam configuration switching is required.

In a possible implementation, the terminal device carries the second-type signal on a time domain resource other than a resource interval in which the first time domain resource is located. In other words, the terminal device does not expect the second-type signal to be carried in the resource interval in which the first time domain resource is located. For example, the first time domain resource is one or more consecutive symbols, and the resource interval in which the first time domain resource is located may be a slot in which the one or more consecutive symbols are located. The terminal device does not receive or send the second-type signal in the resource interval in which the first time domain resource is located. In this way, transmission reliability of the first-type signal can be ensured in the resource interval in which the first time domain resource is located, and beam configuration switching does not occur, thereby avoiding impact of beam configuration switching on the first-type signal.

In a possible implementation, if the first time domain resource is before the second time domain resource, the second-type signal is carried on a time domain resource other than N time domain units that are after the first time domain resource and that are close to the first time domain resource. In other words, the terminal device does not expect the second-type signal to be carried on the N time domain units that are after the first time domain resource and that are close to the first time domain resource.

In a possible implementation, if the first time domain resource is after the second time domain resource, the second-type signal is carried on a time domain resource other than N time domain units that are before the first time domain resource and that are close to the first time domain resource. In other words, the terminal device does not expect the second-type signal to be carried on the N time domain units that are before the first time domain resource and that are close to the first time domain resource.

In a possible implementation, if there is an overlapping time domain unit between the first time domain resource and the second time domain resource, and the second time domain resource includes the first time domain resource, the second-type signal is carried on a time domain resource other than N time domain units that are before and after the first time domain resource and that are close to the first time domain resource. In other words, the terminal device does not expect the second-type signal to be carried on the N time domain units that are before and after the first time domain resource and that are close to the first time domain resource.

In the foregoing several possible implementations, "close to" may indicate a first time domain unit before and/or after the first time domain resource, or may indicate a $Z^{th}$ time domain unit before and/or after the first time domain resource. Z time domain units may be a resource that is between the first time domain resource and the second time domain resource and that does not carry another signal. The time domain unit may be, for example, a symbol.

In a possible implementation, if there is an overlapping time domain unit between the first time domain resource and the second time domain resource, and the first time domain resource includes the second time domain resource, the terminal device does not send or receive the second-type signal on the second time domain resource. The overlapping time domain unit means that both the first time domain resource and the second time domain resource include the time domain unit. The first-type signal and the second-type signal originally need to be carried on the overlapping time domain unit, and the terminal device does not send or receive the second-type signal, so that beam configuration switching does not need to occur before and after the overlapping time domain unit. Therefore, transmission impact of the first-type signal caused by beam configuration switching is avoided.

In a possible implementation, if the second time domain resource overlaps the N time domain units, the terminal device sends or receives the second-type signal at a location that is in the second time domain resource and that is other than time domain units occupied by the N time domain units. The second time domain resource overlaps the N time domain units, that is, the N time domain units affect normal transmission of the second-type signal on some time domain units of the second time domain resource. Additionally, it is also possible that the entire second time domain resource overlaps the N time domain units. In this case, transmission of the second-type signal on all resources of the second time domain resource is affected.

In a possible implementation, a value of N is specified in a protocol, or may be notified by the network device to the terminal device. The value of N is determined based on any one or more of the following information: a beam configuration switching delay or duration required for beam configuration switching, a subcarrier spacing SCS, a length of a symbol, or a length of a cyclic prefix CP of a symbol.

In a possible implementation, the terminal device receives second information from the network device, where the second information indicates that a priority of the first-type signal is higher than a priority of the second-type signal. The terminal device can determine locations of the N time domain units based on a comparison between the priority of the first-type signal and the priority of the second-type signal, to ensure transmission reliability of a signal with a high priority. For example, if the first-type signal has a high priority, it is ensured that the N time domain units do not occupy a time domain unit of the first time domain resource, but occupy a time domain unit of the second time domain resource.

The total length of the N time domain units is greater than or equal to the beam configuration switching delay or the duration required for switching the first beam configuration to the second beam configuration. In this way, normal data sending is not affected when beam configuration switching is performed, thereby ensuring data transmission reliability. Generally, the total length of the N time domain units is equal to the beam configuration switching delay.

According to a second aspect, a signal transmission method is provided. The method may be performed by a network device, or may be performed by a component (for example, a processor, a chip, or a chip system) in a network device. The method is described by using a network device as an example. The method may be implemented by using the following steps: the network device determines first information based on a constraint condition, where the first information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal; and the constraint condition is that there are N time domain units between the second time domain resource and the first time domain resource, where N is a positive integer. The network device sends the first information to a terminal device.

The first constraint condition can be used to restrict that when the network device configures the first time domain resource and the second time domain resource, a requirement that there are N time domain units between the second time domain resource and the first time domain resource is met. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

In a possible implementation, a value of N is specified in a protocol, or a value of N is determined based on any one or more of the following information: a beam configuration switching delay, a subcarrier spacing (SCS), a length of a symbol, or a length of a cyclic prefix (CP) of a symbol.

In a possible implementation, the network device sends second information to the terminal device, where the second information indicates that a priority of the first-type signal is higher than a priority of the second-type signal. In this way, the terminal device can determine locations of the N time domain units based on a comparison between the priority of the first-type signal and the priority of the second-type signal, to ensure transmission reliability of a signal with a high priority. For example, if the first-type signal has a high priority, it is ensured that the N time domain units do not occupy a time domain unit of the first time domain resource, but occupy a time domain unit of the second time domain resource.

In a possible implementation, the total length of the N time domain units is greater than or equal to the beam configuration switching delay. In this way, normal data sending is not affected when beam configuration switching is performed, thereby ensuring data transmission reliability. Generally, the total length of the N time domain units is equal to the beam configuration switching delay.

According to a third aspect, a signal transmission method is provided. The method may be performed by a terminal device, or may be performed by a component (for example, a processor, a chip, or a chip system) in a terminal device. The method is described by using a terminal device as an example. The method may be implemented by using the following steps: the terminal device receives third information from a network device, where the third information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal. The terminal device sends or receives a signal based on the third information, where the first-type signal is sent or received on the first time domain resource, and the second-type signal is not sent or received on N time domain units before and/or after the first time domain resource.

The terminal device does not send or receive the second-type signal on the N time domain units before and/or after the first time domain resource. Therefore, it can also be ensured that there is an interval of N time domain units between transmitting the first-type signal and transmitting the second-type signal. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

In a possible implementation, the total length of the N time domain units is greater than or equal to the beam configuration switching delay. In this way, normal data sending is not affected when beam configuration switching is performed, thereby ensuring data transmission reliability. Generally, the total length of the N time domain units is equal to the beam configuration switching delay.

In a possible implementation, if the first time domain resource is before the second time domain resource, the second-type signal is not sent or received on N time domain units that are after the first time domain resource and that are close to the first time domain resource.

In a possible implementation, if the first time domain resource is after the second time domain resource, the second-type signal is not sent or received on N time domain units that are before the first time domain resource and that are close to the first time domain resource.

In a possible implementation, when there is an overlapping time domain unit between the first time domain resource and the second time domain resource, and the second time domain resource includes the first time domain resource, the second-type signal is not sent or received on N time domain units that are before and after the first time domain resource and that are close to the first time domain resource.

In the foregoing several possible implementations, "close to" may indicate a first time domain unit before and/or after the first time domain resource, or may indicate a $Y^{th}$ time domain unit before and/or after the first time domain resource. Y time domain units may be a resource that is between the first time domain resource and the second time domain resource and that does not carry another signal. The time domain unit may be, for example, a symbol.

In a possible implementation, if there is an overlapping time domain unit between the first time domain resource and the second time domain resource, and the first time domain resource includes the second time domain resource, the second-type signal is not sent or received on the second time domain resource. The overlapping time domain unit means that both the first time domain resource and the second time domain resource include the time domain unit. The first-type signal and the second-type signal originally need to be carried on the overlapping time domain unit, and the terminal device does not send or receive the second-type signal, so that beam configuration switching does not need to occur before and after the overlapping time domain unit. Therefore, transmission impact of the first-type signal caused by beam configuration switching is avoided.

In a possible implementation, if the first time domain resource is before and/or after the second time domain resource, the second-type signal is received at a location that is in the second time domain resource and that is other than time domain units occupied by the N time domain units. The second time domain resource overlaps the N time domain units, that is, the N time domain units affect normal transmission of the second-type signal on some time domain units of the second time domain resource. Further, it is also possible that the entire second time domain resource overlaps the N time domain units. In this case, transmission of the second-type signal on all resources of the second time domain resource is affected.

In a possible implementation, if there is an overlapping time domain unit between the first time domain resource and the second time domain resource, the first-type signal is sent or received on the overlapping time domain unit, and the second-type signal is not sent or received. The terminal device does not send or receive the second-type signal, so that beam configuration switching does not need to occur before and after the overlapping time domain unit. Therefore, transmission impact of the first-type signal caused by beam configuration switching is avoided.

In a possible implementation, a value of N is specified in a protocol, or a value of N is determined based on any one or more of the following information: a beam configuration switching delay, a subcarrier spacing (SCS), a length of a symbol, or a length of a cyclic prefix (CP) of a symbol.

In a possible implementation, the terminal device receives second information from the network device, where the second information indicates that a priority of the first-type signal is higher than a priority of the second-type signal. The terminal device can determine locations of the N time domain units based on a comparison between the priority of the first-type signal and the priority of the second-type signal, to ensure transmission reliability of a signal with a high priority. For example, if the first-type signal has a high priority, it is ensured that the N time domain units do not occupy a time domain unit of the first time domain resource, but occupy a time domain unit of the second time domain resource.

According to a fourth aspect, a signal transmission method is provided. The method may be performed by a network device, or may be performed by a component (for example, a processor, a chip, or a chip system) in a network device. The method is described by using a network device as an example. The method may be implemented by using the following steps: The network device maps a signal in a mapping manner based on a specified condition. The specified condition includes: a first time domain resource is used to map a first-type signal, a second time domain resource is used to map a second-type signal, and a first beam configuration of the first-type signal is different from a second beam configuration of the second-type signal. The mapping manner includes: mapping the first-type signal to the first time domain resource, and skipping mapping the second-type signal to N time domain units before and/or after the first time domain resource. The network device sends a mapped signal to a terminal device, or the network device receives a signal from a terminal device in a mapping manner.

The network device does not map the second-type signal to the N time domain units before and/or after the first time domain resource. Therefore, it can be ensured that there is an interval of N time domain units between transmitting the first-type signal and transmitting the second-type signal. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

In a possible implementation, the total length of the N time domain units is greater than or equal to the beam configuration switching delay. In this way, normal data sending is not affected when beam configuration switching is performed, thereby ensuring data transmission reliability. Generally, the total length of the N time domain units is equal to the beam configuration switching delay.

In a possible implementation, if the first time domain resource is before the second time domain resource, the second-type signal is not mapped to N time domain units that are after the first time domain resource and that are close to the first time domain resource.

In a possible implementation, if the first time domain resource is after the second time domain resource, the second-type signal is not mapped to N time domain units that are before the first time domain resource and that are close to the first time domain resource.

In a possible implementation, when there is an overlapping time domain unit between the first time domain resource and the second time domain resource, and the second time domain resource includes the first time domain resource, the second-type signal is not mapped to N time domain units that are before and after the first time domain resource and that are close to the first time domain resource.

In the foregoing several possible implementations, "close to" may indicate a first time domain unit before and/or after the first time domain resource, or may indicate a $Y^{th}$ time domain unit before and/or after the first time domain resource. Y time domain units may be a resource that is between the first time domain resource and the second time domain resource and that does not carry another signal. The time domain unit may be, for example, a symbol.

In a possible implementation, if there is an overlapping time domain unit between the first time domain resource and the second time domain resource, and the first time domain resource includes the second time domain resource, the second-type signal is not mapped to the second time domain resource. In this way, if there is no second-type signal at a time domain location of the first time domain resource, beam configuration switching does not need to be performed. This avoids impact on normal signal transmission due to beam configuration switching.

In a possible implementation, the first time domain resource and the second time domain resource are adjacent in time domain. Alternatively, no signal is mapped to a time domain resource between the first time domain resource and the second time domain resource.

In a possible implementation, there is an overlapping time domain unit between the first time domain resource and the second time domain resource.

In a possible implementation, the mapping manner further includes: if the first time domain resource is before and/or after the second time domain resource, mapping the second-type signal to a location that is in the second time domain resource and that is other than time domain units occupied by the N time domain units.

In a possible implementation, the mapping manner further includes: if there is an overlapping time domain unit between the first time domain resource and the second time domain resource, mapping the first-type signal to the overlapping time domain unit, and skipping mapping the second-type signal. In this way, beam configuration switching does not need to occur before and after the overlapping time domain unit. Therefore, transmission impact of the first-type signal caused by beam configuration switching is avoided.

In a possible implementation, a value of N is specified in a protocol, or a value of N is determined based on any one or more of the following information: a beam configuration switching delay, a subcarrier spacing (SCS), a length of a symbol, or a length of a cyclic prefix (CP) of a symbol.

In a possible implementation, the network device sends second information to the terminal device, where the second information indicates that a priority of the first-type signal is higher than a priority of the second-type signal. The priority of the first-type signal may be higher than the priority of the second-type signal. In this way, N time domain units before and/or after the first time domain resource are constrained not to carry the second-type signal, so that a signal with a high priority is not affected by beam configuration switching, and transmission reliability of the signal with the high priority is ensured.

In a possible implementation, it is assumed that the priority of the first-type signal and the priority of the second-type signal are the same, and beam configurations of the two types of signals are different. The signal transmission method may be implemented in the following manners. For example, the mapping manner of the network device includes: mapping the second-type signal to the second time domain resource, and skipping mapping the first-type signal to the N time domain units before and/or after the second time domain resource.

According to a fifth aspect, a communication apparatus is provided. The communication apparatus may be a terminal device, may be an apparatus (for example, a chip, a chip system, or a circuit) in a terminal device, or may be an apparatus that can be used with a terminal device. In an implementation, the terminal device may include modules that are in a one-to-one correspondence with the method/operations/steps/actions performed by the terminal device described in the first aspect. The modules may be implemented by a hardware circuit, software, or a combination of a hardware circuit and software. In an implementation, the communication apparatus may include a processing module and a communication module. The processing module is configured to invoke the communication module to perform a receiving and/or sending function. For example, the communication module is configured to receive first information from a network device, where the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal. The communication module is further configured to send or receive a signal based on the first information. The second-type signal is carried on a time domain resource other than N time domain units before and/or after the first time domain resource. In other words, the terminal device does not expect the second-type signal to be carried on the N time domain units before and/or after the first time domain resource, where N is a positive integer.

In a possible implementation, the communication module is configured to send or receive a third-type signal on the N time domain units. The processing module expects to send or receive the third-type signal on the N time domain units, and a third beam configuration of the third-type signal is the same as the first beam configuration. When a signal with the third beam configuration that is the same as the first beam configuration is sent on the N time domain units, a same beam configuration may be used on the N time domain units, and no beam configuration switching is required.

In a possible implementation, the communication module is configured to carry the second-type signal on a time domain resource other than a resource interval in which the first time domain resource is located. In other words, the processing module does not expect the second-type signal to be carried in the resource interval in which the first time domain resource is located. For example, the first time domain resource is one or more consecutive symbols, and the resource interval in which the first time domain resource is located may be a slot in which the one or more consecutive symbols are located. The terminal device does not receive or send the second-type signal in the resource interval in which the first time domain resource is located. In this way, transmission reliability of the first-type signal can be ensured in the resource interval in which the first time domain resource is located, and beam configuration switching does not occur, thereby avoiding impact of beam configuration switching on the first-type signal.

In a possible implementation, if the first time domain resource is before the second time domain resource, the second-type signal is carried on a time domain resource other than N time domain units that are after the first time domain resource and that are close to the first time domain resource. In other words, the processing module does not expect the second-type signal to be carried on the N time domain units that are after the first time domain resource and that are close to the first time domain resource.

In a possible implementation, if the first time domain resource is after the second time domain resource, the second-type signal is carried on a time domain resource other than N time domain units that are before the first time domain resource and that are close to the first time domain resource. In other words, the processing module does not expect the second-type signal to be carried on the N time domain units that are before the first time domain resource and that are close to the first time domain resource.

In a possible implementation, if there is an overlapping time domain unit between the first time domain resource and the second time domain resource, and the second time domain resource includes the first time domain resource, the second-type signal is carried on a time domain resource other than N time domain units that are before and after the first time domain resource and that are close to the first time domain resource. In other words, the processing module does not expect the second-type signal to be carried on the N time domain units that are before and after the first time domain resource and that are close to the first time domain resource.

In the foregoing several possible implementations, "close to" may indicate a first time domain unit before and/or after the first time domain resource, or may indicate a $Z^{th}$ time domain unit before and/or after the first time domain resource. Z time domain units may be a resource that is between the first time domain resource and the second time domain resource and that does not carry another signal. The time domain unit may be, for example, a symbol.

In a possible implementation, if there is an overlapping time domain unit between the first time domain resource and the second time domain resource, and the first time domain resource includes the second time domain resource, the terminal device does not send or receive the second-type signal on the second time domain resource. The overlapping time domain unit means that both the first time domain resource and the second time domain resource include the time domain unit. The first-type signal and the second-type signal originally need to be carried on the overlapping time domain unit, and the communication module does not send or receive the second-type signal, so that beam configuration switching does not need to occur before and after the overlapping time domain unit. Therefore, transmission impact of the first-type signal caused by beam configuration switching is avoided.

In a possible implementation, if the second time domain resource overlaps the N time domain units, the communication module is configured to send or receive the second-type signal at a location that is in the second time domain resource and that is other than time domain units occupied by the N time domain units. The second time domain resource overlaps the N time domain units, that is, the N time domain units affect normal transmission of the second-type signal on some time domain units of the second time domain resource. Further, it is also possible that the entire second time domain resource overlaps the N time domain units. In this case, transmission of the second-type signal on all resources of the second time domain resource is affected.

In a possible implementation, a value of N is specified in a protocol, or may be notified by the network device to the terminal device. The value of N is determined based on any one or more of the following information: a beam configuration switching delay or duration required for beam configuration switching, a subcarrier spacing (SCS), a length of a symbol, or a length of a cyclic prefix (CP) of a symbol.

In a possible implementation, the communication module is further configured to receive second information from the network device, where the second information indicates that a priority of the first-type signal is higher than a priority of the second-type signal. The terminal device can determine locations of the N time domain units based on a comparison between the priority of the first-type signal and the priority of the second-type signal, to ensure transmission reliability of a signal with a high priority. For example, if the first-type signal has a high priority, it is ensured that the N time domain units do not occupy a time domain unit of the first time domain resource, but occupy a time domain unit of the second time domain resource.

The total length of the N time domain units is greater than or equal to the beam configuration switching delay or the duration required for switching the first beam configuration to the second beam configuration. In this way, normal data sending is not affected when beam configuration switching is performed, thereby ensuring data transmission reliability. Generally, the total length of the N time domain units is equal to the beam configuration switching delay.

According to a sixth aspect, a communication apparatus is provided. The communication apparatus may be a network device, an apparatus (for example, a chip, a chip system, or a circuit) in a network device, or may be an apparatus that can be used with a network device. In an implementation, the network device may include modules that are in a one-to-one correspondence with the method/operations/steps/actions performed by the network device described in the second aspect. The modules may be implemented by a hardware circuit, software, or a combination of a hardware circuit and software. In an implementation, the communication apparatus may include a processing module and a communication module. The processing module is configured to invoke the communication module to perform a receiving and/or sending function. For example, the processing module is configured to determine first information based on a constraint condition, where the first information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal. The constraint condition is that there are N time domain units between the second time domain resource and the first time domain resource, where N is a positive integer. The communication module is configured to send the first information to a terminal device.

The first constraint condition can be used to restrict that when the network device configures the first time domain resource and the second time domain resource, a requirement that there are N time domain units between the second time domain resource and the first time domain resource is met. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

In a possible implementation, a value of N is specified in a protocol, or a value of N is determined based on any one or more of the following information: a beam configuration switching delay, a subcarrier spacing (SCS), a length of a symbol, or a length of a cyclic prefix (CP) of a symbol.

In a possible implementation, the communication module is further configured to send second information to the terminal device, where the second information indicates that a priority of the first-type signal is higher than a priority of the second-type signal. In this way, the terminal device can determine locations of the N time domain units based on a comparison between the priority of the first-type signal and the priority of the second-type signal, to ensure transmission reliability of a signal with a high priority. For example, if the first-type signal has a high priority, it is ensured that the N time domain units do not occupy a time domain unit of the first time domain resource, but occupy a time domain unit of the second time domain resource.

In a possible implementation, the total length of the N time domain units is greater than or equal to the beam configuration switching delay. In this way, normal data sending is not affected when beam configuration switching is performed, thereby ensuring data transmission reliability. Generally, the total length of the N time domain units is equal to the beam configuration switching delay.

According to a seventh aspect, a communication apparatus is provided. The communication apparatus may be a terminal device, may be an apparatus (for example, a chip, a chip system, or a circuit) in a terminal device, or may be an apparatus that can be used with a terminal device. In an implementation, the terminal device may include modules that are in a one-to-one correspondence with the method/operations/steps/actions performed by the terminal device described in the third aspect. The modules may be implemented by a hardware circuit, software, or a combination of a hardware circuit and software. In an implementation, the communication apparatus may include a processing module and a communication module. The processing module is configured to invoke the communication module to perform a receiving and/or sending function. For example, the communication module is configured to receive third information from a network device, where the third information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal. The communication module is further configured to send or receive a signal based on the third information, where the first-type signal is sent or received on the first time domain resource, and the second-type signal is not sent or received on N time domain units before and/or after the first time domain resource.

The terminal device does not send or receive the second-type signal on the N time domain units before and/or after the first time domain resource. Therefore, it can also be ensured that there is an interval of N time domain units between transmitting the first-type signal and transmitting the second-type signal. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

In a possible implementation, the total length of the N time domain units is greater than or equal to the beam configuration switching delay. In this way, normal data sending is not affected when beam configuration switching is performed, thereby ensuring data transmission reliability. Generally, the total length of the N time domain units is equal to the beam configuration switching delay.

In a possible implementation, if the first time domain resource is before the second time domain resource, the second-type signal is not sent or received on N time domain units that are after the first time domain resource and that are close to the first time domain resource.

In a possible implementation, if the first time domain resource is after the second time domain resource, the second-type signal is not sent or received on N time domain units that are before the first time domain resource and that are close to the first time domain resource.

In a possible implementation, when there is an overlapping time domain unit between the first time domain resource and the second time domain resource, and the second time domain resource includes the first time domain resource, the second-type signal is not sent or received on N time domain units that are before and after the first time domain resource and that are close to the first time domain resource.

In the foregoing several possible implementations, "close to" may indicate a first time domain unit before and/or after the first time domain resource, or may indicate a $Y^{th}$ time domain unit before and/or after the first time domain resource. Y time domain units may be a resource that is between the first time domain resource and the second time domain resource and that does not carry another signal. The time domain unit may be, for example, a symbol.

In a possible implementation, if there is an overlapping time domain unit between the first time domain resource and the second time domain resource, and the first time domain resource includes the second time domain resource, the second-type signal is not sent or received on the second time domain resource. The overlapping time domain unit means that both the first time domain resource and the second time domain resource include the time domain unit. The first-type signal and the second-type signal originally need to be carried on the overlapping time domain unit, and the terminal device does not send or receive the second-type signal, so that beam configuration switching does not need to occur before and after the overlapping time domain unit. Therefore, transmission impact of the first-type signal caused by beam configuration switching is avoided.

In a possible implementation, if the first time domain resource is before and/or after the second time domain resource, the second-type signal is received at a location that is in the second time domain resource and that is other than time domain units occupied by the N time domain units. The second time domain resource overlaps the N time domain units, that is, the N time domain units affect normal transmission of the second-type signal on some time domain units of the second time domain resource. Additionally, it is also possible that the entire second time domain resource overlaps the N time domain units. In this case, transmission of the second-type signal on all resources of the second time domain resource is affected.

In a possible implementation, if there is an overlapping time domain unit between the first time domain resource and the second time domain resource, the first-type signal is sent or received on the overlapping time domain unit, and the second-type signal is not sent or received. The terminal device does not send or receive the second-type signal, so that beam configuration switching does not need to occur before and after the overlapping time domain unit. Therefore, transmission impact of the first-type signal caused by beam configuration switching is avoided.

In a possible implementation, a value of N is specified in a protocol, or a value of N is determined based on any one or more of the following information: a beam configuration switching delay, a subcarrier spacing (SCS), a length of a symbol, or a length of a cyclic prefix (CP) of a symbol.

In a possible implementation, the communication module is further configured to receive second information from the network device, where the second information indicates that a priority of the first-type signal is higher than a priority of the second-type signal. The terminal device can determine locations of the N time domain units based on a comparison between the priority of the first-type signal and the priority of the second-type signal, to ensure transmission reliability of a signal with a high priority. For example, if the first-type signal has a high priority, it is ensured that the N time domain units do not occupy a time domain unit of the first time domain resource, but occupy a time domain unit of the second time domain resource.

According to an eighth aspect, a communication apparatus is provided. The communication apparatus may be a network device, an apparatus (for example, a chip, a chip system, or a circuit) in a network device, or may be an apparatus that can be used with a network device. In an implementation, the network device may include modules that are in a one-to-one correspondence with the method/operations/steps/actions performed by the network device described in the fourth aspect. The modules may be implemented by a hardware circuit, software, or a combination of a hardware circuit and software. In an implementation, the communication apparatus may include a processing module and a communication module. The processing module is configured to invoke the communication module to perform a receiving and/or sending function. For example, the processing module is configured to map a signal in a mapping manner based on a specified condition. The specified condition includes: a first time domain resource is used to map a first-type signal, a second time domain resource is used to map a second-type signal, and a first beam configuration of the first-type signal is different from a second beam configuration of the second-type signal. The mapping manner includes: mapping the first-type signal to the first time domain resource, and skipping mapping the second-type signal to N time domain units before and/or after the first time domain resource. The communication module is configured to send a mapped signal to the terminal device, or receive a signal from the terminal device in a mapping manner.

The network device does not map the second-type signal to the N time domain units before and/or after the first time domain resource. Therefore, it can be ensured that there is an interval of N time domain units between transmitting the first-type signal and transmitting the second-type signal. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

In a possible implementation, the total length of the N time domain units is greater than or equal to the beam configuration switching delay. In this way, normal data sending is not affected when beam configuration switching is performed, thereby ensuring data transmission reliability. Generally, the total length of the N time domain units is equal to the beam configuration switching delay.

In a possible implementation, if the first time domain resource is before the second time domain resource, the processing module does not map the second-type signal to N time domain units that are after the first time domain resource and that are close to the first time domain resource.

In a possible implementation, if the first time domain resource is after the second time domain resource, the processing module does not map the second-type signal to N time domain units that are before the first time domain resource and that are close to the first time domain resource.

In a possible implementation, when there is an overlapping time domain unit between the first time domain resource and the second time domain resource, and the second time domain resource includes the first time domain resource, the processing module does not map the second-type signal to N time domain units that are before and after the first time domain resource and that are close to the first time domain resource.

In the foregoing several possible implementations, "close to" may indicate a first time domain unit before and/or after the first time domain resource, or may indicate a $Y^{th}$ time domain unit before and/or after the first time domain resource. Y time domain units may be a resource that is between the first time domain resource and the second time domain resource and that does not carry another signal. The time domain unit may be, for example, a symbol.

In a possible implementation, if there is an overlapping time domain unit between the first time domain resource and the second time domain resource, and the first time domain resource includes the second time domain resource, the second-type signal is not mapped to the second time domain resource. In this way, if there is no second-type signal at a time domain location of the first time domain resource, beam configuration switching does not need to be performed. This avoids impact on normal signal transmission due to beam configuration switching.

In a possible implementation, the first time domain resource and the second time domain resource are adjacent in time domain. Alternatively, no signal is mapped to a time domain resource between the first time domain resource and the second time domain resource.

In a possible implementation, there is an overlapping time domain unit between the first time domain resource and the second time domain resource.

In a possible implementation, the mapping manner further includes: if the first time domain resource is before and/or after the second time domain resource, mapping the second-type signal to a location that is in the second time domain resource and that is other than time domain units occupied by the N time domain units.

In a possible implementation, the mapping manner further includes: if there is an overlapping time domain unit between the first time domain resource and the second time domain resource, mapping the first-type signal to the overlapping time domain unit, and skipping mapping the second-type signal. In this way, beam configuration switching does not need to occur before and after the overlapping time domain unit. Therefore, transmission impact of the first-type signal caused by beam configuration switching is avoided.

In a possible implementation, a value of N is specified in a protocol, or a value of N is determined based on any one or more of the following information: a beam configuration switching delay, a subcarrier spacing SCS, a length of a symbol, or a length of a cyclic prefix CP of a symbol.

In a possible implementation, the communication module is further configured to send second information to the terminal device, where the second information indicates that a priority of the first-type signal is higher than a priority of the second-type signal. The priority of the first-type signal may be higher than the priority of the second-type signal. In this way, N time domain units before and/or after the first time domain resource are constrained not to carry the second-type signal, so that a signal with a high priority is not affected by beam configuration switching, and transmission reliability of the signal with the high priority is ensured.

In a possible implementation, it is assumed that the priority of the first-type signal and the priority of the second-type signal are the same, and beam configurations of the two types of signals are different. The signal transmission method may be implemented in the following manners. For example, the mapping manner includes: mapping the second-type signal to the second time domain resource, and skipping mapping the first-type signal to the N time domain units before and/or after the second time domain resource.

According to a ninth aspect, an embodiment provides a communication apparatus. The communication apparatus includes a communication interface and a processor. The communication interface is used by the apparatus to communicate with another device, for example, to receive and send data or signals. For example, the communication interface may be a transceiver, a circuit, a bus, a module, or another type of communication interface. The processor is configured to invoke a group of programs, instructions, or data, to perform the method implemented by the terminal device in the first aspect or the third aspect. The apparatus may further include a memory, configured to store the programs, the instructions, or the data invoked by the processor. The memory is coupled to the processor, and when executing the instructions or data stored in the memory, the processor may implement the method performed by the terminal device described in the first aspect or the third aspect.

According to a tenth aspect, an embodiment provides a communication apparatus.

The communication apparatus includes a communication interface and a processor. The communication interface is used by the apparatus to communicate with another device, for example, to receive and send data or signals. For example, the communication interface may be a transceiver, a circuit, a bus, a module, or another type of communication interface. The processor is configured to invoke a group of programs, instructions, or data, to perform the method implemented by the network device in the second aspect or the fourth aspect. The apparatus may further include a memory, configured to store the programs, the instructions, or the data invoked by the processor. The memory is coupled to the processor, and when executing the instructions or data stored in the memory, the processor may implement the method performed by the network device described in the second aspect or the fourth aspect.

According to an eleventh aspect, an embodiment further provides a non-transitory computer-readable storage medium. The non-transitory computer-readable storage medium stores computer-readable instructions, and when the computer-readable instructions are run on a computer, so that the method according to any one of the aspects or the possible implementations of the aspects is performed.

According to a twelfth aspect, an embodiment provides a chip system. The chip system includes one or more processors. The one or more processors are configured to read and execute a software program stored in a memory, so as to implement the method performed by the terminal device in any one of the first aspect, the possible implementations of the first aspect, the third aspect, or the possible implementations of the third aspect. The chip system may include a chip, or may include a chip and another discrete component.

Optionally, the chip system may include a memory, or the chip system is connected to a memory.

According to a thirteenth aspect, an embodiment provides a chip system. The chip system includes one or more processors. The one or more processors are configured to read and execute a software program stored in a memory, so as to implement the method performed by the terminal device in any one of the second aspect, the possible implementations of the second aspect, the fourth aspect, or the possible implementations of the fourth aspect. The chip system may include a chip, or may include a chip and another discrete component.

Optionally, the chip system may include a memory, or the chip system is connected to a memory.

According to a fourteenth aspect, an embodiment provides a communication system. The communication system includes the communication apparatuses in the fifth aspect and the sixth aspect, or includes the communication apparatus according to the seventh aspect and the eighth aspect.

According to a fifteenth aspect, a computer program product including instructions is provided. When the computer program product runs on a computer, the method in the foregoing aspects or any possible implementation of the aspects is implemented.

DETAILED DESCRIPTION OF EMBODIMENTS

Embodiments provide a signal transmission method and a communication apparatus. The method and the apparatus are related to a same concept or based on similar concepts. Because problem-resolving principles of the method and the apparatus are similar, mutual reference may be made to implementations of the apparatus and the method, and repeated parts are not described again.

In descriptions of embodiments, the term "and/or" describes an association relationship between associated objects and indicates that three relationships may exist. For example, A and/or B may indicate the following three cases: only A exists, both A and B exist, and only B exists. "A plurality of" means two or more. In addition, it should be understood that terms such as "first" and "second" are merely used for distinguishing and description, but should not be understood as indicating or implying relative importance, or should not be understood as indicating or implying a sequence.

The following describes in detail embodiments with reference to accompanying drawings.

The signal transmission method and the communication apparatus provided in embodiments may be applied to a 4th generation (4G) communication system, for example, a long term evolution (LTE) system, or a 5th generation (5G) communication system, for example, a 5G new radio (NR) system, and may also be applied to various communication systems that evolve in the future, for example, a 6th generation (6G) communication system or a space-air-ground-sea integrated communication system.

Figure 1:
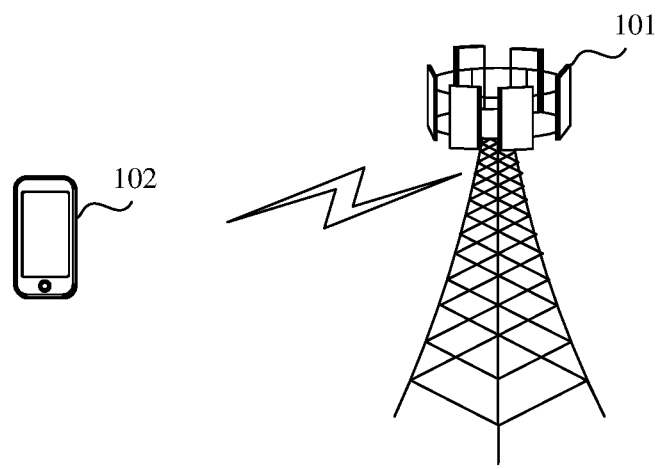
FIG. 1 is a schematic diagram of an architecture of a communication system according to an embodiment.

FIG. 1 is an architecture of a communication system to which an embodiment is applicable. As shown in FIG. 1, the communication system includes a network device 101 and a terminal device 102.

Possible implementations and functions of the network device 101 and the terminal device 102 are first described by using examples.

The network device 101 provides a service for the terminal device 102 within a coverage region of the network device 101. Refer to FIG. 1. For example, the network device 101 provides wireless access for one or more terminal devices 102 within the coverage region of the network device 101.

The network device 101 is a node in a radio access network (RAN), and may also be referred to as a base station, or may be referred to as a RAN node (or a device). Currently, examples of some network devices 101 are: a next generation NodeB (gNB), a next generation evolved NodeB (Ng-eNB), a transmission reception point (TRP), an evolved NodeB (eNB), a radio network controller (RNC), a NodeB (NB), a home base station (for example, a home evolved NodeB, or a home NodeB, (HNB)), a baseband unit (BBU), an active antenna unit (AAU), or a wireless fidelity (Wi-Fi) access point (AP). The network device 101 may also be a satellite. The satellite may also be referred to as a high-altitude platform, a high-altitude aircraft, or a satellite base station. Alternatively, the network device 101 may be another device that has a function of the network device. For example, the network device 101 may be alternatively a device that functions as a network device in device-to-device (D2D) communication, vehicle-to-everything, or machine-to-machine (M2M) communication. Alternatively, the network device 101 may be any possible network device in a future communication system.

The terminal device 102 is also referred to as user equipment (UE), a mobile station (MS), a mobile terminal (MT), or the like, and is a device that provides a user with voice and/or data connectivity. For example, the terminal device 102 includes a handheld device, a vehicle-mounted device, or the like that has a wireless connection function. Currently, the terminal device 102 may be a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an uncrewed aerial vehicle, or an aircraft), or the like. The terminal device 102 may alternatively be another device having a terminal device function. For example, the terminal device 102 may be alternatively a device that functions as a terminal device in D2D communication, vehicle-to-everything, or machine-to-machine M2M communication. Additionally, when communication is performed between network devices, a network device that functions as a terminal device may also be considered as a terminal device.

To better understand the method provided in embodiments, several concepts and terms are first described.

(1) Beam Configuration

The beam configuration may include a configuration such as a beam width or a beam direction. The beam configuration may be used to configure a receive beam, or may be used to configure a transmit beam.

(2) Quasi-Co-Location (QCL)

The QCL indicates that a plurality of resources have one or more same or similar communication features. For a plurality of resources having a QCL relationship, a same or similar communication configuration may be used. For example, if two antenna ports have a QCL relationship, a large-scale channel property in which one port transmits one symbol may be inferred from a large-scale channel property in which the other port transmits one symbol. The large-scale property may include at least one of the following features: a delay spread (delay spread), an average delay, a Doppler spread, a Doppler shift, an average gain, a receiving parameter, a receive beam number of the terminal device, a transmit/receive channel correlation, a receive angle of arrival, a spatial correlation of a receiver antenna, a main angle of arrival (AoA), an average angle of arrival, an AoA spread, and the like. For another example, if two signals have a QCL relationship, there is a QCL relationship between antenna ports that send the two signals.

In this embodiment, QCL of the two signals may indicate that the two signals have the QCL relationship, or the two signals meet the QCL relationship.

QCL types include a plurality of types, such as a type A, a type B, a type C, or a type D. The type-D indicates that spatial receiving parameters (spatial Rx parameter) of two signals appear to have a QCL relationship at a receive end. For example, a physical downlink control channel (PDCCH) in one slot and a reference signal 1 have a QCL type D relationship. In this case, the terminal device may determine that a configuration of a receive beam used by the PDCCH in the slot is the same as a configuration of a receive beam of the reference signal 1. The terminal device may determine, based on the configuration of the receive beam of the reference signal 1, the configuration of the receive beam used by the PDCCH in the slot.

(3) Transmission Configuration Index (TCI)

An upper layer configures a QCL based on a TCI state (TCI-State). The TCI can be configured as follows: the network device sends RRC signaling to the terminal device, and configures a TCI-related parameter. The network device sends MAC CE signaling to the terminal device for activation. The MAC CE signaling is carried on a PDSCH. The terminal device receives the MAC CE signaling, and feeds back an acknowledgment response. Alternatively, the network device sends DCI to the terminal device to configure the TCI.

For example, a 3-bit TCI field is used in the downlink control information (DCI) to indicate a QCL, and an initially configured TCI state is inactive, and needs to be activated by using medium access control element (MAC CE) signaling.

In embodiments, the TCI may be used to indicate a beam configuration of the terminal device. For example, the TCI indicates a beam direction used by the terminal device, including a direction of a receive beam, and may further include a direction of a transmit beam. It is assumed that the beam configuration uses a receive beam direction as an example for description. For example, if TCI corresponding to a PDCCH in a slot 1 is 1, it may indicate that a receive beam direction of the terminal device and the reference signal 1 have a QCL type D relationship. If DCI carried on the PDCCH in the slot 1 indicates that TCI of a physical downlink shared channel (PDSCH) that is scheduled by the DCI and that is in a slot 3 is 3, it may indicate that a receive beam direction of the terminal device for the PDSCH and a reference signal 2 has a QCL type D relationship.

(4) Subcarrier Spacing (SCS)

Embodiments may be applied to a high frequency band (for example, a frequency band above 52.6 GHz) scenario. A high frequency band has abundant spectrum resources. A maximum available bandwidth of a single frequency band can reach about 2000 megahertz (MHz), which is suitable for transmitting heavy-traffic services. An NR will introduce a larger SCS, such as 960 kHz, to perform frequency-domain scheduling in a large-bandwidth frequency band. A bandwidth of 2000 MHz is used as an example, and frequency-domain scheduling may be performed by using 170 resource blocks (RBs) of 960 kHz. In frequency domain, a bandwidth of one RB is a bandwidth of two REs, and a bandwidth of one RE is an SCS. Therefore, for 960 kHz (such as 0.96 MHz), a bandwidth occupied by 170 RBs is 0.96 MHz×170×12=1958.4 MHz.

A larger SCS indicates a shorter symbol and a shorter slot length. A length of one slot in the NR is 14 symbols. For example, if the SCS is 15 kHz, there are 14 symbols in one millisecond, and one slot length is 1 millisecond. If the SCS is 60 kHz, there are 14×4=56 symbols in one millisecond, and one slot length is ¼=0.25 milliseconds.

(5) Cyclic Prefix (CP)

Figure 2:
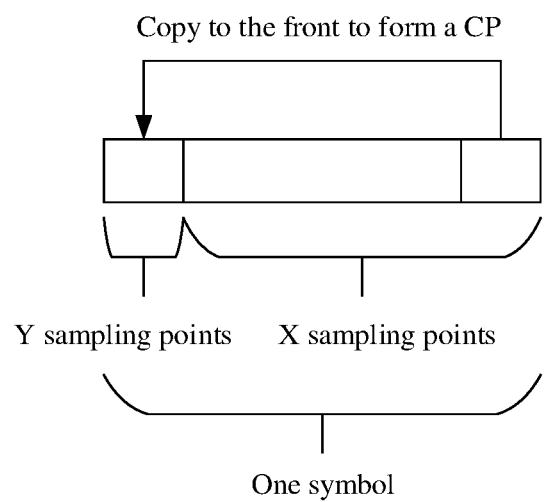
FIG. 2 is a schematic diagram of a symbol in a new radio (NR) system according to an embodiment.

In an NR system, each symbol has a CP. When a symbol of the NR system is generated, a temporary symbol having X sampling points is first generated, and then Y sampling points at the end of the temporary symbol are copied and placed in front of the X sampling points, to generate a complete symbol of the NR system, as shown in FIG. 2. First Y sampling points of the symbol in the NR system are a CP. A quantity of sampling points of the CP is associated with an SCS. A larger SCS indicates a smaller quantity of sampling points of the CP, and therefore a shorter length corresponding to the CP in terms of time. For example, a CP time length of a symbol of a 240 kHz SCS is about 290 ns, and a CP time length of a symbol of a 960 kHz SCS is about 72.5 ns.

(6) Beam Configuration Switching Delay

The beam configuration switching delay is duration required for switching a beam configuration. When different beam configurations are used for signals sent or received on different time domain resources, beam configuration switching needs to be performed. Both the network device and the terminal device perform beam configuration switching. Beam configuration switching may also be referred to as a beam configuration change. Beam configuration switching has a delay, for example, 100 ns. The network device is not allowed to send any signal in a beam configuration switching process, and it also takes some time for the terminal device to change the beam configuration. The time is related to a capability of the terminal device. A stronger capability of the terminal device indicates a shorter time required for changing the beam configuration.

The beam configuration switching delay may affect receiving and sending of normal signals. Because sampling points in a CP are copied, it is acceptable that some CPs are affected (for example, interfered or discarded) when symbols of an NR system are received. Therefore, when the beam configuration switching delay is less than or equal to a length of the CP, beam configuration switching affects only the CP, but does not affect normal data. Impact of the CP is acceptable. In a system with a small SCS, a length of a CP may be greater than an analog beam configuration switching delay. For example, a length of a CP of a 120 kHz SCS is about 590 ns, which is greater than a beam configuration switching delay of 100 ns.

However, when the SCS is large, the analog beam configuration switching delay may be greater than the length of the CR In this case, the beam configuration switching delay affects receiving and sending of a normal signal, and beam configuration switching may affect receiving and sending of an entire symbol. For example, a length of a CP of a 960 kHz SCS is about 72.5 ns, which is less than a beam configuration switching delay of 100 ns.

The signal transmission method provided in this embodiment is used to resolve a problem that a beam configuration switching process affects receiving and sending of normal signals.

Figure 3:
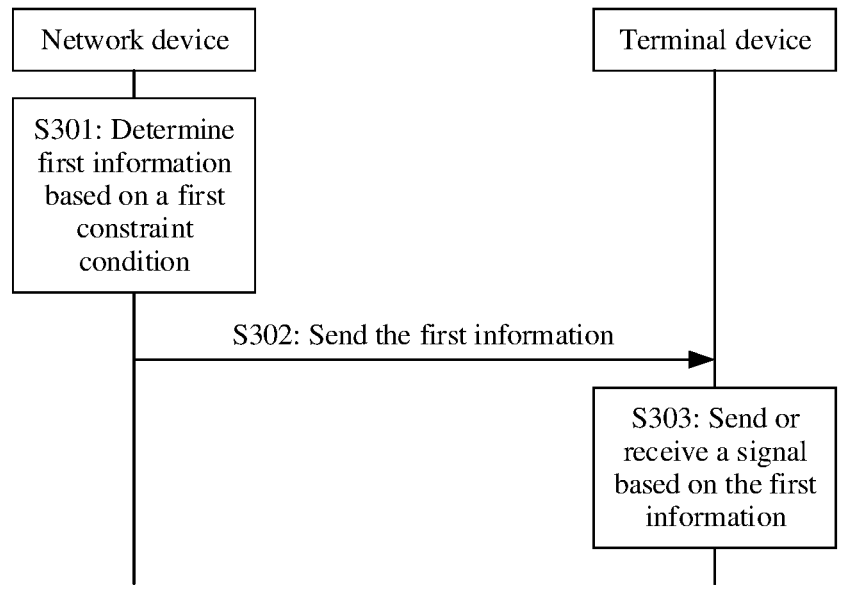
FIG. 3 is a schematic flowchart of a first signal transmission method according to an embodiment.

As shown in FIG. 3, a procedure of a first signal transmission method according to an embodiment is described as follows:

S301: A network device determines first information based on a first constraint condition.

The first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal. The network device needs to schedule the first time domain resource and the second time domain resource based on the first constraint condition. The first constraint condition is that there are N time domain units between the second time domain resource and the first time domain resource. Alternatively, the first constraint condition is that no second-type signal is carried on N time domain units before and/or after the first time domain resource.

It may be understood that the network device determines the first information based on the first constraint condition. The first time domain resource and the second time domain resource configured by the network device meet the first constraint condition. Additionally, the first time domain resource and the second time domain resource configured by the network device may alternatively not meet the first constraint condition.

S302: The network device sends the first information to a terminal device, and correspondingly, the terminal device receives the first information from the network device.

S303: The terminal device sends or receives a signal based on the first information.

The second-type signal is carried on a time domain resource other than the N time domain units before and/or after the first time domain resource, or the terminal device does not expect the second-type signal to be carried on the N time domain units before and/or after the first time domain resource.

The terminal device sends or receives the signal on the first time domain resource based on the first information. If the first time domain resource is an uplink time domain resource, the terminal device sends the signal on the first time domain resource. If the first time domain resource is a downlink time domain resource, the terminal device receives the signal on the first time domain resource.

The first constraint condition can be used to restrict that when the network device configures the first time domain resource and the second time domain resource, a requirement that there are N time domain units between the second time domain resource and the first time domain resource is met. The terminal device does not expect the second-type signal to be carried on the N time domain units before and/or after the first time domain resource. This can restrict the terminal device from not receiving the second-type signal or not receiving any signal on the N time domain units before and/or after the first time domain resource. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

The following describes some optional implementations of the embodiment in FIG. 3.

Figure 4A:
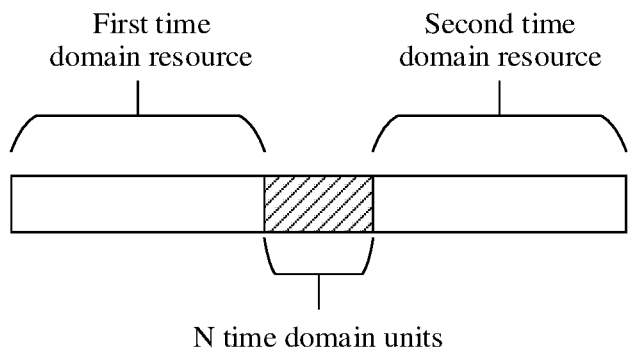
FIG. 4a is a first schematic diagram of locations of N time domain units according to an embodiment.

As shown in FIG. 4a, if the first time domain resource is before the second time domain resource, the second-type signal is carried on a time domain resource other than N time domain units that are after the first time domain resource and that are close to the first time domain resource. Alternatively, the terminal device does not expect the second-type signal to be carried on the N time domain units that are after the first time domain resource and that are close to the first time domain resource. In other words, the terminal device expects that the second-type signal is carried on a time domain resource other than the N time domain units that are after the first time domain resource and that are close to the first time domain resource.

Correspondingly, when the network device configures the first information, the first constraint condition is that the second-type signal is not carried on the N time domain units that are after the first time domain resource and that are close to the first time domain resource. Alternatively, the first constraint condition is that the second-type signal should be carried on a time domain resource other than the N time domain units after the first time domain resource. It can be understood that there should be N time domain units between the first time domain resource and the second time domain resource.

Figure 4B:
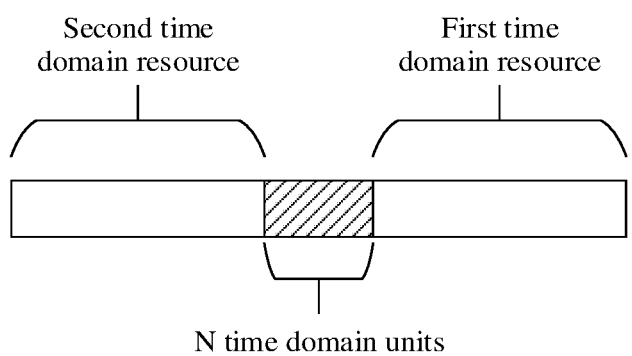
FIG. 4b is a second schematic diagram of locations of N time domain units according to an embodiment.

As shown in FIG. 4b, if the first time domain resource is after the second time domain resource, the terminal device does not expect the second-type signal to be carried on N time domain units that are before the first time domain resource and that are close to the first time domain resource. Alternatively, the second-type signal is carried on a time domain resource other than the N time domain units that are before the first time domain resource and that are close to the first time domain resource. In other words, the terminal device expects that the second-type signal is not carried on the N time domain units that are before the first time domain resource and that are close to the first time domain resource.

Correspondingly, when the network device configures the first information, the first constraint condition is that the second-type signal is not carried on the N time domain units that are before the first time domain resource and that are close to the first time domain resource. Alternatively, the first constraint condition is that the second-type signal should be carried on a time domain resource other than the N time domain units before the first time domain resource. It can be understood that there should be N time domain units between the first time domain resource and the second time domain resource.

Alternatively, the network device may not comply with the first constraint condition. An interval between the second time domain resource and the first time domain resource is less than N time domain units, or the second-type signal is carried on N time domain units before and/or after the first time domain resource. Because the terminal device does not expect the second-type signal to be carried on the N time domain units before and/or after the first time domain resource, the terminal device determines, based on the first information, that some or all of the N time domain units are used to carry the second-type signal. The terminal device may perform any one of the following operations: (1) the terminal device does not receive or send any signal on the N time domain units. Optionally, for example, if the second time domain resource is an uplink time domain resource, the terminal device does not send any signal on the N time domain units. For another example, if the second time domain resource is a downlink time domain resource, the terminal device does not receive any signal on the N time domain units. (2) The terminal device receives or sends a signal on the N time domain units based on the first beam configuration. Optionally, if the first beam configuration is an uplink beam, that the terminal device sends a signal on the N time domain units based on the first beam configuration may include sending the first-type signal, or may include sending the second-type signal. Optionally, if the first beam configuration is a downlink beam, that the terminal device receives a signal on the N time domain units based on the first beam configuration may include receiving the first-type signal, or may include receiving the second-type signal. (3) Behavior of the terminal device is uncertain.

An example of a case in which some or all of the N time domain units are used to carry the second-type signal is as follows: In the following several cases, the terminal device may perform any one of the foregoing operations (1) to (3).

Figure 5A:
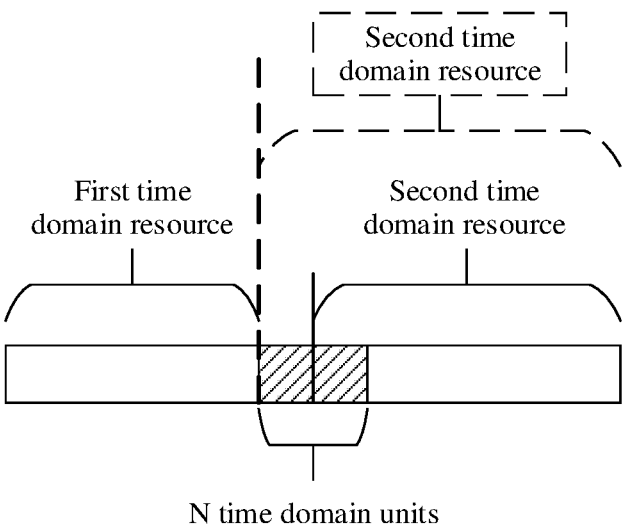
FIG. 5a is a third schematic diagram of locations of N time domain units according to an embodiment.

As shown in FIG. 5a, when the first time domain resource is before the second time domain resource, the second-type signal is carried on some or all of the N time domain units that are after the first time domain resource and that are close to the first time domain resource. A dashed line indicates that the second-type signal is carried on all of the N time domain units that are after the first time domain resource and that are close to the first time domain resource.

Figure 5B:
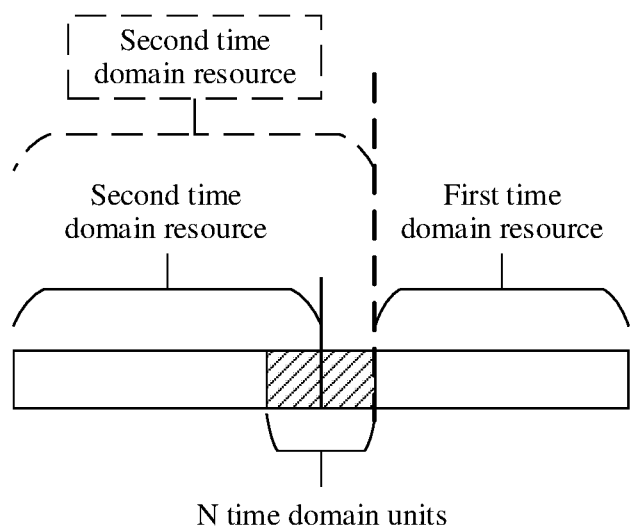
FIG. 5b is a fourth schematic diagram of locations of N time domain units according to an embodiment.

As shown in FIG. 5b, when the first time domain resource is after the second time domain resource, the second-type signal is carried on some or all of the N time domain units that are before the first time domain resource and that are close to the first time domain resource. A dashed line indicates that the second-type signal is carried on all of the N time domain units that are before the first time domain resource and that are close to the first time domain resource.

Figure 5C:
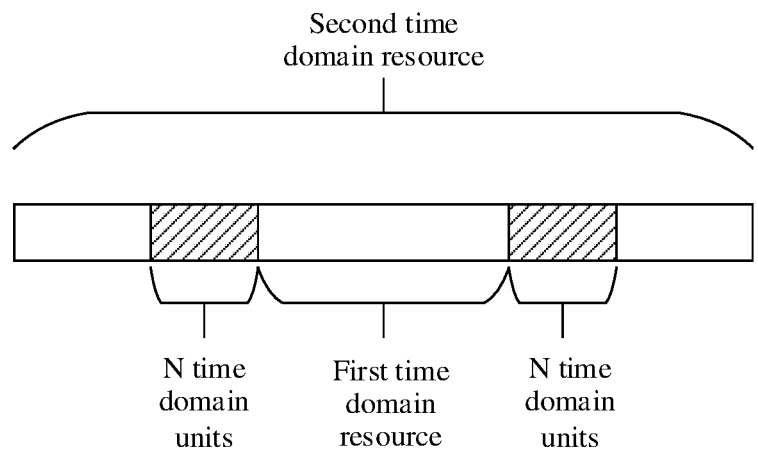
FIG. 5c is a fifth schematic diagram of locations of N time domain units according to an embodiment.

As shown in FIG. 5c, if there is an overlapping time domain unit between the first time domain resource and the second time domain resource, and the second time domain resource includes the first time domain resource, the terminal device determines that all of N time domain units that are before and after the first time domain resource and that are close to the first time domain resource are used to carry the second-type signal.

In a possible implementation, the terminal device allows to send or receive a third-type signal on the N time domain units, where a third beam configuration of the third-type signal is the same as the first beam configuration. Correspondingly, the network device may schedule the third-type signal on the N time domain units. For example, when the network device schedules the third-type signal on the N time domain units, the terminal device sends or receives the third-type signal on the N time domain units. If the N time domain units are an uplink resource, the terminal device sends the third-type signal on the N time domain units. If the N time domain units are a downlink resource, the terminal device receives the third-type signal on the N time domain units.

In S303, the terminal device sends or receives the signal based on the first information. For sending or receiving a second-type signal, if a configuration of the network device meets the first constraint condition, the terminal device only needs to send or receive the signal on the second time domain resource. If the second time domain resource is an uplink time domain resource, the terminal device sends the signal on the second time domain resource at the N time domain units that are before and/or after the first time domain resource. If the second time domain resource is a downlink time domain resource, the terminal device receives the signal on the second time domain resource at the N time domain units that are before and/or after the first time domain resource.

The following further describes the embodiment in FIG. 3 in detail by using an example.

A start and length indication value (start & length indication value, SLIV) is introduced first. The SLIV is carried in DCI, and is used to notify the terminal device of a start location and a length of a PDSCH/PUSCH in one slot. The SLIV can indicate only one start location and one length.

Figure 6:
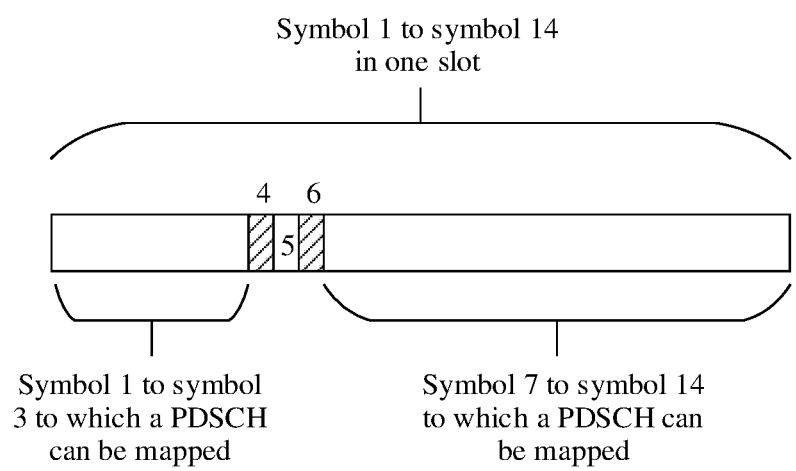
FIG. 6 is a schematic diagram of time domain resource scheduling according to an embodiment.

As shown in FIG. 6, a channel state information reference signal (CSI-RS) is a first-type signal, and a physical downlink shared channel (PDSCH) is a second-type signal. A symbol 5 in the slot is a first time domain resource, and is used to carry the CSI-RS. It is assumed that N=1. The first constraint condition is that no second-type signal is carried on the N time domain units before and/or after the first time domain resource, that is, no PDSCH is carried on one time domain unit before and/or after the symbol 5. That is, the PDSCH is not carried on a symbol 4 and/or a symbol 6. The PDSCH is scheduled based on an indication of the SLIV, and in one slot, the SLIV indicates only one start location and one length. Therefore, the PDSCH can be mapped only to symbols 1 to 3 or to symbols 7 to 14. The network device may schedule the PDSCH on the symbols 1 to 3, and the PDSCH is not carried on one symbol before the symbol 5, such as the symbol 4. Alternatively, the network device may schedule the PDSCH on the symbols 7 to 14, and the PDSCH is not carried on one symbol after the symbol 5, such as the symbol 6.

The network device does not indicate, based on the first constraint condition, a PDSCH configuration whose start location is 1 and whose length is 10, that is, does not indicate a PDSCH configuration on a symbol 1 to a symbol 10, because the network device knows that the terminal device does not receive the PDSCH on symbols 4 to 6. In addition, the terminal device does not know how a PDSCH in the symbols 4 to 6 is mapped. Therefore, when the network device performs scheduling, if a beam configuration of the PDSCH is inconsistent with the CSI-RS, the network device prevents the PDSCH indicated by the SLIV from being mapped to a time domain resource including the symbols 4 to 6, but maps the PDSCH only to the symbols 1 to 3 or the symbols 7 to 14 by using the SLIV. If an analog beam configuration of the PDSCH is consistent with the CSI-RS, the network device has no constraint on scheduling, and may map a time domain resource of the PDSCH by using an SLIV that includes symbols 1 to 14.

In a possible implementation, the terminal device does not expect the second-type signal to be carried in a resource interval in which the first time domain resource is located. For example, the first time domain resource is one or more consecutive symbols, the resource interval in which the first time domain resource is located is a slot in which the one or more consecutive symbols are located, and the terminal device does not expect the slot in which the first time domain resource is located to carry the second-type signal. In other words, the terminal device expects a third-type signal to be carried in the resource interval in which the first time domain resource is located, and a third beam configuration of the third-type signal is the same as the first beam configuration.

Correspondingly, the network device needs to schedule a resource based on a constraint condition, which may be denoted as a second constraint condition herein. The second constraint condition is that the second-type signal is not carried in the resource interval in which the first time domain resource is located, or the constraint condition is that the third-type signal is allowed to be carried in the resource interval in which the first time domain resource is located, and the third beam configuration of the third-type signal is the same as the first beam configuration. For example, the first time domain resource is one or more consecutive symbols, and the resource interval in which the first time domain resource is located is a slot in which the one or more consecutive symbols are located. The network device does not schedule, in the slot in which the first time domain resource is located, a signal with a beam configuration different from the first beam configuration. In other words, the network device schedules only, in the slot in which the first time domain resource is located, a signal with a beam configuration the same as the first beam configuration. Still refer to FIG. 6. Based on the second constraint condition, the network device does not schedule the PDSCH in the entire slot in which the symbol 5 is located, and the terminal device does not receive the PDSCH in the entire slot in which the symbol 5 is located.

In this embodiment, it can be understood that both the constraint condition on a network device side and the understanding of signal transmission on a terminal device side ensure that transmission of the first-type signal is not affected. It may be understood that, in a possible implementation, different types of signals may have priorities. A priority of the first-type signal may be higher than a priority of the second-type signal. In this way, N time domain units before and/or after the first time domain resource are constrained not to carry the second-type signal, so that a signal with a high priority is not affected by beam configuration switching, and transmission reliability of the signal with the high priority is ensured.

The priorities of the different types of signals may be specified in a protocol, or may be notified by the network device to the terminal device. For example, information about the priorities is carried by using RRC signaling. Several different types of signals are used as an example. Priorities of the several different types of signals are sorted in descending order as follows: a synchronization signal/broadcast signal block (SS/PBCH block), a channel state information measurement reference signal (CSI-RS) signal responsible for layer 1-reference signal received power (L1-RSRP) measurement, a control resource set (CORESET) 0, a CORESET with a positive integer number, a common CSI-RS, a reference signal of a high-reliability PDSCH (a PDSCH that may be encoded by using a lower bit rate), a reference signal of a common PDSCH, and a data signal of a PDSCH.

The priority of the first-type signal and the priority of the second-type signal may be specified in the protocol, or may be notified by the network device to the terminal device. The network device may send second information to the terminal device. Correspondingly, the terminal device receives the second information from the network device, where the second information indicates that the priority of the first-type signal is higher than the priority of the second-type signal.

Figure 7:
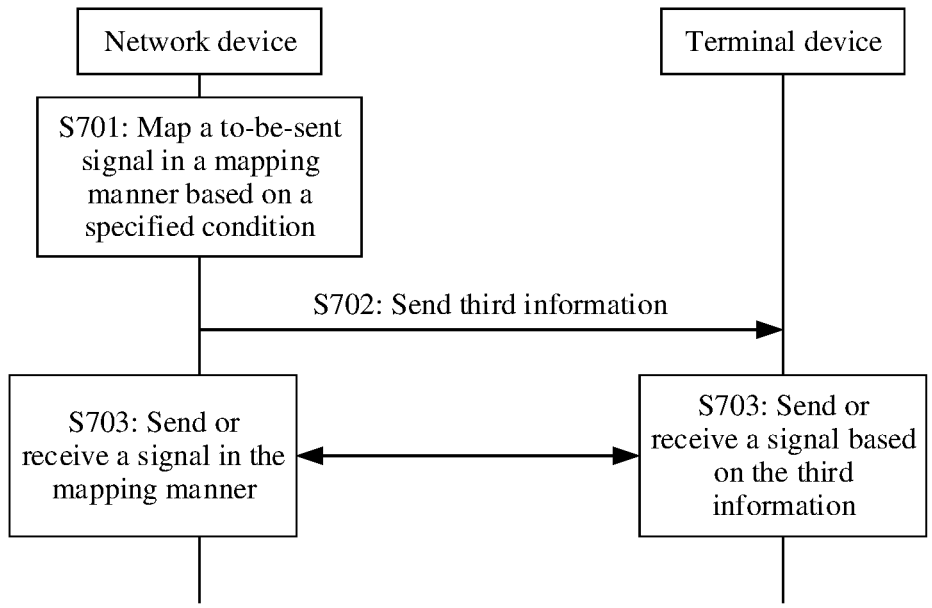
FIG. 7 is a schematic flowchart of a second signal transmission method according to an embodiment.

Based on a same concept, as shown in FIG. 7, a procedure of a second signal transmission method according to an embodiment is described as follows:

S701: A network device maps a signal in a mapping manner based on a specified condition.

The specified condition includes: a first time domain resource is used to map a first-type signal, a second time domain resource is used to map a second-type signal, and a first beam configuration of the first-type signal is different from a second beam configuration of the second-type signal.

The mapping manner includes: mapping the first-type signal to the first time domain resource, and skipping mapping the second-type signal to N time domain units before and/or after the first time domain resource.

S702: The network device sends third information to a terminal device, and correspondingly, the terminal device receives the third information from the network device.

The third information is used to schedule the first time domain resource and the second time domain resource, the first time domain resource is used to map the first-type signal, the second time domain resource is used to map the second-type signal, and the first beam configuration of the first-type signal is different from the second beam configuration of the second-type signal.

S703: The network device sends a mapped signal to the terminal device, or the network device receives a signal from the terminal device in a mapping manner, and correspondingly, the terminal device sends or receives the signal based on the third information.

The terminal device may send or receive the signal based on the third information in the following manner:

The terminal device sends or receives the first-type signal on the first time domain resource, and does not send or receive the second-type signal on the N time domain units before and/or after the first time domain resource.

The terminal device sends or receives the first-type signal on the first time domain resource, and if the first time domain resource is an uplink time domain resource, the terminal device sends the signal on the first time domain resource. If the first time domain resource is a downlink time domain resource, the terminal device receives the signal on the first time domain resource.

The terminal device does not send or receive the second-type signal on the N time domain units before and/or after the first time domain resource. If the second-type signal is an uplink signal, it means that the terminal device does not send the second-type signal on the N time domain units before and/or after the first time domain resource. If the second-type signal is a downlink signal, it means that the terminal device does not receive the second-type signal on the N time domain units before and/or after the first time domain resource.

If the first time domain resource is before and/or after the second time domain resource, the terminal device sends or receives the second-type signal at a location that is in the second time domain resource and that is other than time domain units occupied by the N time domain units. If the second-type signal is an uplink signal, the terminal device sends the second-type signal at the location that is in the second time domain resource and that is other than the time domain units occupied by the N time domain units. If the second-type signal is a downlink signal, the terminal device receives the second-type signal at the location that is in the second time domain resource and that is other than the time domain units occupied by the N time domain units.

If there is an overlapping time domain unit between the first time domain resource and the second time domain resource, the first-type signal is sent or received on the overlapping time domain unit, and the second-type signal is not sent or received. If the overlapping time domain unit is an uplink time domain unit, the first-type signal is sent on the overlapping time domain unit, and the second-type signal is not sent. If the overlapping time domain unit is a downlink time domain unit, the first-type signal is received on the overlapping time domain unit, and the second-type signal is not received.

The network device does not map the second-type signal to the N time domain units before and/or after the first time domain resource. Therefore, it can be ensured that there is an interval of N time domain units between transmitting the first-type signal and transmitting the second-type signal. The terminal device does not send or receive the second-type signal on the N time domain units before and/or after the first time domain resource. Therefore, it can also be ensured that there is an interval of N time domain units between transmitting the first-type signal and transmitting the second-type signal. In this way, it can be ensured that beam configuration switching is performed on the N time domain units. The N time domain units may be flexibly configured. For example, the N time domain units may be configured to meet a beam configuration switching delay, and a total length of the N time domain units is greater than or equal to the beam configuration switching delay. In this way, it is ensured that the network device and the terminal device can have enough time to complete beam configuration switching without affecting receiving and sending of a normal signal. In addition, a signal on the first time domain resource can be normally received and sent, so that normal transmission of a signal of a type (for example, a high priority) can be ensured.

The following describes some optional implementations of the embodiment in FIG. 7.

It may be understood that in the embodiment in FIG. 7, when configuring the first time domain resource and the second time domain resource, the network device may not be constrained by the first constraint condition or the second constraint condition in the embodiment in FIG. 3. Therefore, the N time domain units may occupy a portion of the second time domain resource. Further, it is also possible that there is an interval between the first time domain resource and the second time domain resource. If the interval is greater than or equal to the N time domain units, the N time domain units do not occupy the portion of the second time domain resource. If the interval is less than the N time domain units, the N time domain units may include the interval and a portion of the second time domain resource.

For example, it is assumed that the N time domain units are two symbols, and there is an interval of one symbol between the first time domain resource and the second time domain resource. In this case, the N time domain units are the one symbol between the first time domain resource and the second time domain resource and one symbol on the second time domain resource. The N time domain units are one or more consecutive time domain units.

First, several scenarios are used as examples to describe locations of the N time domain units. The following uses an example in which the N time domain units occupy a portion of the second time domain resource.

Figure 8A:
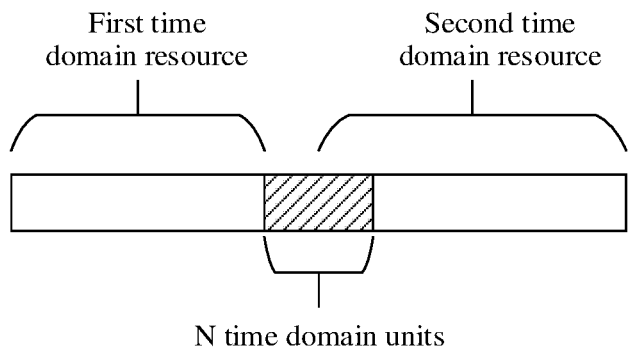
FIG. 8a is a sixth schematic diagram of locations of N time domain units according to an embodiment.

As shown in FIG. 8a, if the first time domain resource is before the second time domain resource, the network device does not map the second-type signal to N time domain units that are after the first time domain resource and that are close to the first time domain resource. Correspondingly, the terminal device does not send or receive the second-type signal on the N time domain units that are after the first time domain resource and that are close to the first time domain resource. If the second-type signal is an uplink signal, the second-type signal is not sent on the N time domain units that are after the first time domain resource and that are close to the first time domain resource. If the second-type signal is a downlink signal, the downlink signal is not received on the N time domain units that are after the first time domain resource and that are close to the first time domain resource.

Figure 8B:
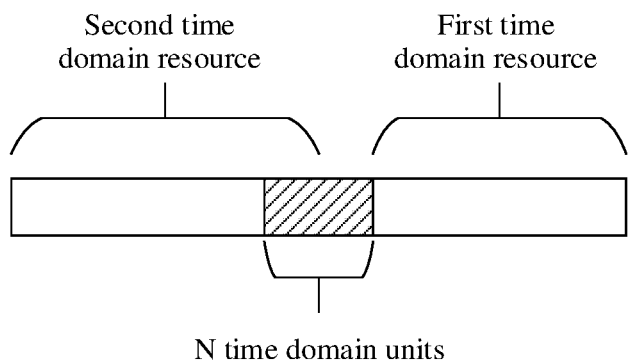
FIG. 8b is a seventh schematic diagram of locations of N time domain units according to an embodiment.

As shown in FIG. 8b, if the first time domain resource is after the second time domain resource, the network device does not map the second-type signal to N time domain units that are before the first time domain resource and that are close to the first time domain resource. Correspondingly, the terminal device does not send or receive the second-type signal on the N time domain units that are before the first time domain resource and that are close to the first time domain resource. If the second-type signal is an uplink signal, the second-type signal is not sent on the N time domain units that are before the first time domain resource and that are close to the first time domain resource. If the second-type signal is a downlink signal, the downlink signal is not received on the N time domain units that are before the first time domain resource and that are close to the first time domain resource.

Figure 8C:
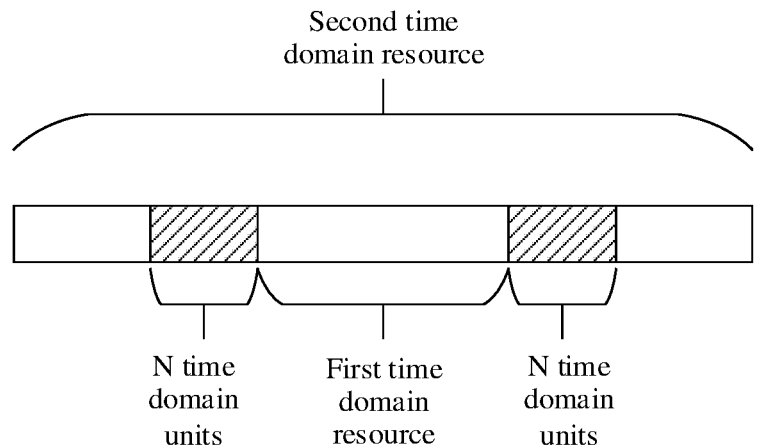
FIG. 8c is an eighth schematic diagram of locations of N time domain units according to an embodiment.

As shown in FIG. 8c, if there is an overlapping time domain unit between the first time domain resource and the second time domain resource, and the second time domain resource includes the first time domain resource, the network device does not map the second-type signal to N time domain units that are before and after the first time domain resource and that are close to the first time domain resource. Correspondingly, the terminal device does not send or receive the second-type signal on the N time domain units that are before and after the first time domain resource and that are close to the first time domain resource. If the second-type signal is an uplink signal, the second-type signal is not sent on the N time domain units that are before and after the first time domain resource and that are close to the first time domain resource. If the second-type signal is a downlink signal, the downlink signal is not received on the N time domain units that are before and after the first time domain resource and that are close to the first time domain resource.

Figure 8D:
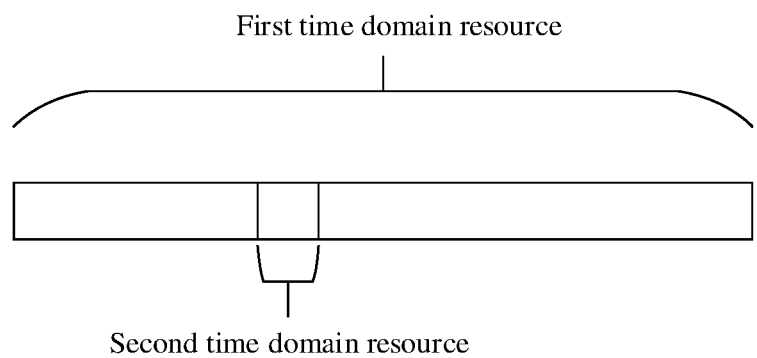
FIG. 8d is a schematic diagram of a location of a time domain resource according to an embodiment.

As shown in FIG. 8d, if there is an overlapping time domain unit between the first time domain resource and the second time domain resource, and the first time domain resource includes the second time domain resource, the network device does not map the second-type signal to the second time domain resource. Correspondingly, the terminal device does not send or receive the second-type signal on the second time domain resource. If the second-type signal is an uplink signal, the terminal device does not send the second-type signal on the second time domain resource. If the second-type signal is a downlink signal, the terminal device does not receive the second-type signal on the second time domain resource. In this way, if there is no second-type signal at a time domain location of the first time domain resource, beam configuration switching does not need to be performed. This avoids impact on normal signal transmission due to beam configuration switching.

The following describes several cases in FIG. 8a to FIG. 8d by using examples.

Figure 9A:
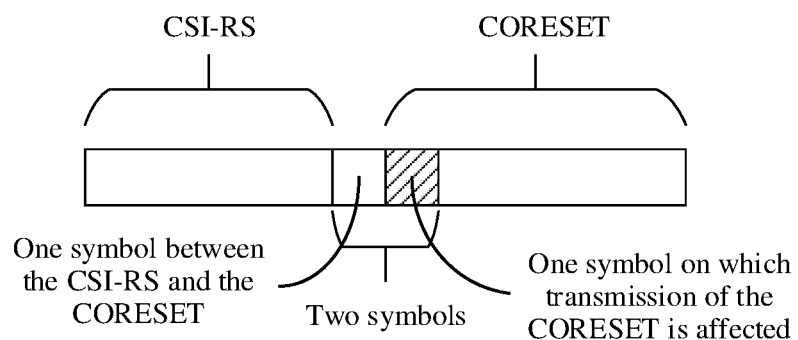
FIG. 9a is a first schematic diagram of locations of different types of signals according to an embodiment.

Based on FIG. 8a, as shown in FIG. 9a, it is assumed that the first-type signal is a CSI-RS, and the second-type signal is a CORESET. There is only one symbol between the CORESET and the CSI-RS in time domain, and beam configurations of the CORESET and the CSI-RS are different, and the N time domain units are two symbols. The network device does not map the CORESET on two symbols after a time domain resource of the CSI-RS.

Correspondingly, the terminal device does not receive the CORESET on the two symbols after the time domain resource of the CSI-RS. One symbol in the two symbols is the one symbol between the CORESET and the CSI-RS in time domain, and the other symbol in the two symbols is one symbol in a time domain resource of the CORESET.

Figure 9B:
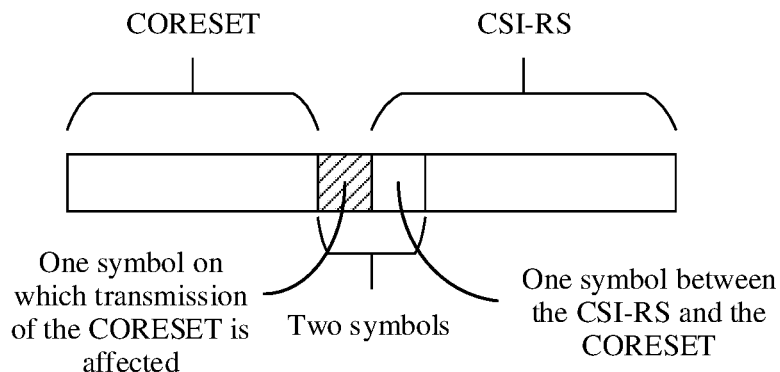
FIG. 9b is a second schematic diagram of locations of different types of signals according to an embodiment.

Based on FIG. 8b, as shown in FIG. 9b, it is assumed that the first-type signal is a CSI-RS, and the second-type signal is a CORESET. There is only one symbol between the CORESET and the CSI-RS in time domain, and beam configurations of the CORESET and the CSI-RS are different, and the N time domain units are two symbols. The network device does not map the CORESET on two symbols before a time domain resource of the CSI-RS.

Correspondingly, the terminal device does not receive the CORESET on the two symbols before the time domain resource of the CSI-RS. One symbol in the two symbols is the one symbol between the CORESET and the CSI-RS in time domain, and the other symbol in the two symbols is one symbol in a time domain resource of the CORESET.

Figure 9C:
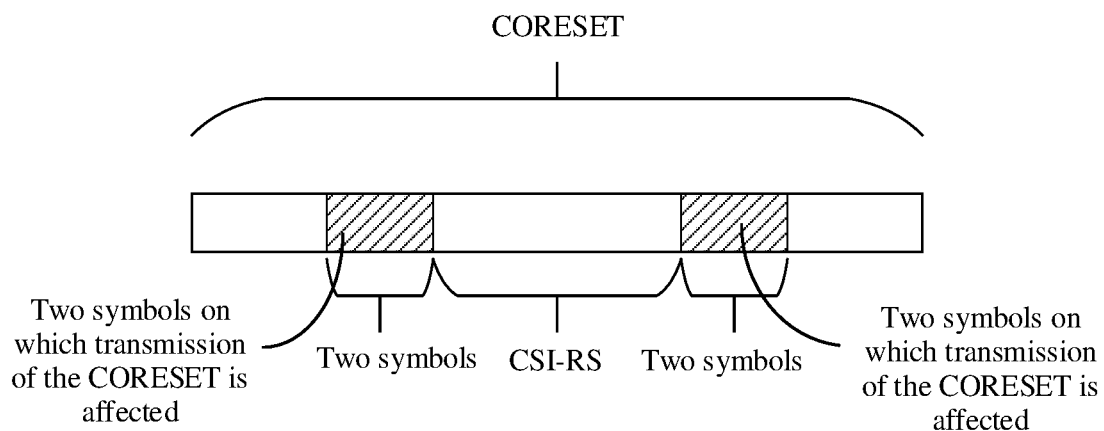
FIG. 9c is a third schematic diagram of locations of different types of signals according to an embodiment.

Based on FIG. 8c, as shown in FIG. 9c, it is assumed that the first-type signal is a CSI-RS, and the second-type signal is a CORESET. If there is an overlapping time domain unit between a time domain resource of the CSI-RS and a time domain resource of the CORESET, and the time domain resource of the CORESET includes the time domain resource of the CSI-RS, a location of the time domain resource of the CSI-RS is located in a location of the time domain resource of the CORESET. Beam configurations of the CORESET and the CSI-RS are different, and the N time domain units are two symbols. The network device does not map the CORESET on two symbols before and after the time domain resource of the CSI-RS. Correspondingly, the terminal device does not receive the CORESET on the two symbols before and after the time domain resource of the CSI-RS. The two symbols are symbols in the time domain resource of the CORESET.

Figure 9D:
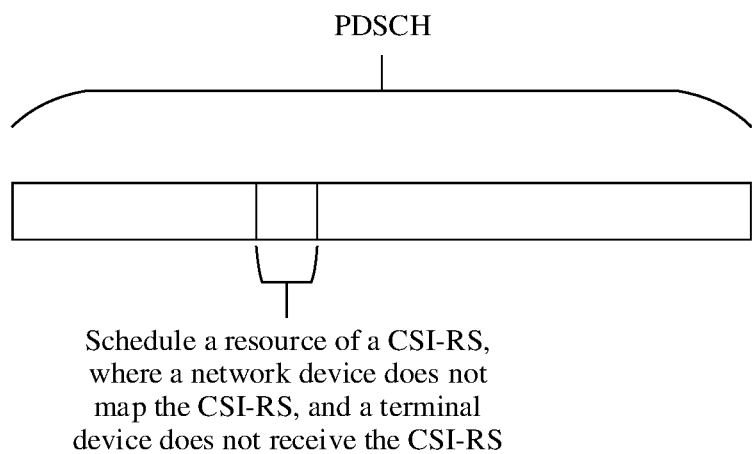
FIG. 9d is a fourth schematic diagram of locations of different types of signals according to an embodiment.

Based on FIG. 8d, as shown in FIG. 9d, it is assumed that the first-type signal is a PDSCH, the second-type signal is a CSI-RS, and a first time domain resource of the PDSCH includes a second time domain resource of the CSI-RS. In other words, a location of the second time domain resource of the CSI-RS falls in the first time domain resource of the PDSCH. The network device may map the PDSCH to the location of the second time domain resource of the CSI-RS, and does not map the CSI-RS. Correspondingly, the terminal device does not receive the CSI-RS at the location of the second time domain resource of the CSI-RS, and receives the PDSCH.

The following describes a possible implementation in which the network device does not map the second-type signal. For different types of signals, an implementation of not mapping the second-type signal is described as follows:

It is assumed that the second-type signal is a PDSCH or a PDCCH, and no signal may be mapped by rate matching or puncturing. Rate matching is an operation performed during PDSCH/PDCCH encoding, that is, during encoding, it is not considered that a time-frequency resource that is not mapped exists. Even if an SLIV indicates that the PDSCH is mapped to symbols 1 to 14, because the PDSCH is not mapped to symbols 3 to 5, it is considered that the PDSCH is mapped to symbols 1 and 2 and symbols 6 to 14 during encoding. Puncturing is an operation after encoding. For example, during encoding and resource mapping, it is considered that a time-frequency resource that is not mapped exists. However, during actual sending, a signal on the time-frequency resource that is not mapped cannot be sent. For example, when the SLIV indicates that the PDSCH is mapped to the symbols 1 to 14, during encoding, it is considered that the PDSCH is mapped to the symbols 1 to 14. If the symbols 3 to 5 are punctured, during actual sending, the symbols 3 to 5 are not sent, but only symbols 1 and 2 and 6 to 14 are sent.

It is assumed that the second-type signal is a DMRS, and that the DMRS is not mapped means that a symbol on which the DMRS is located is changed. For example, a symbol 1 cannot be used to map the second-type signal. However, the DMRS is originally mapped to the symbol 1. In this case, the DMRS needs to be mapped to a new symbol. For example, the DMRS is mapped to an $X^{th}$ symbol on which a PDSCH/PDCCH signal can be sent. Here, X is a positive integer, and a value is specified in a protocol or is configurable. For example, X may be configured by using radio resource control (RRC) signaling or physical signaling. For example, when a first symbol on which the PDSCH/PDCCH signal can be sent is a symbol 3, and X=1, the DMRS is mapped to the symbol 3.

It is assumed that the second-type signal is a CSI-RS, and that the CSI-RS is not mapped means that the CSI-RS is not sent.

In the embodiment in FIG. 7, it can be understood that, after configuring the first time domain resource and the second time domain resource, the network device ensures complete mapping of the first-type signal when mapping a signal. This may affect mapping of the second-type signal. When sending or receiving a signal, the terminal device also ensures transmission reliability of the first-type signal. It may be understood that, in a possible implementation, different types of signals may have priorities. A priority of the first-type signal may be higher than a priority of the second-type signal. In this way, N time domain units before and/or after the first time domain resource are constrained not to carry the second-type signal, so that a signal with a high priority is not affected by beam configuration switching, and transmission reliability of the signal with the high priority is ensured.

For understanding and design of the priorities of the different types of signals, refer to related descriptions in the foregoing optional manners of the embodiment in FIG. 3. Details are not described herein again.

For example, a priority of the CSI-RS (for example, a CSI-RS used for channel state information measurement instead of a CSI-RS used for L1-RSRP) is higher than a priority of some CORESETs with positive integer sequence numbers. In this case, the N time domain units are located before and/or after a time domain resource of the CSI-RS.

For another example, the protocol may directly specify that: when a CSI-RS overlaps with a PDSCH on a time domain resource in time domain (for example, the PDSCH indicated by an SLIV is mapped to symbols 1 to 14 in a slot, and the CSI-RS is mapped to a symbol 5 in the same slot), or when a CSI-RS is adjacent to a PDSCH in time domain, the PDSCH does not map a signal to first and/or last N symbols of CSI-RS symbols. This indicates that a priority of the PDSCH is lower than that of the foregoing CSI-RS.

It is assumed that the priority of the first-type signal and the priority of the second-type signal are the same, and beam configurations of the two types of signals are different. Signal transmission may be implemented according to the embodiment of FIG. 7. The signal transmission method may also be implemented in the following manner. For example, the mapping manner of the network device includes: mapping the second-type signal to the second time domain resource, and skipping mapping the first-type signal to the N time domain units before and/or after the second time domain resource.

For example, there are originally a symbols between a resource of the first-type signal and a resource of the second-type signal, the N time domain units are N symbols, and the N time domain units may occupy the a symbols for separation. If the N time domain units are greater than the a symbols, some symbols of the first time domain resource or the second time domain resource further need to be occupied.

Figure 10A:
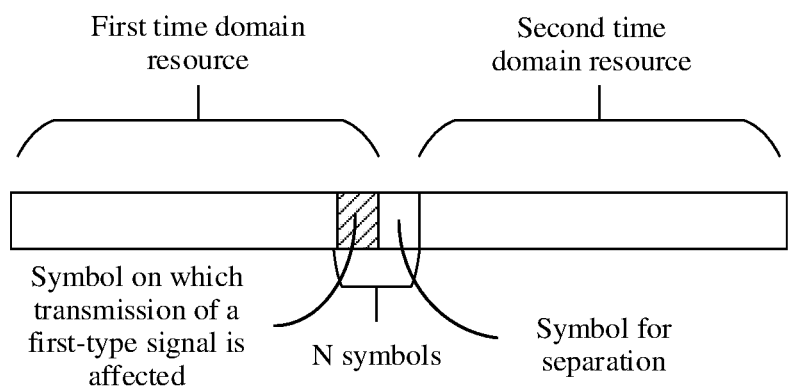
FIG. 10a is a ninth schematic diagram of locations of N time domain units according to an embodiment.

For example, as shown in FIG. 10a, the first time domain resource is before the second time domain resource, and the N time domain units occupy some symbols of the first time domain resource. In this case, the first-type signal is not mapped to the following N symbols starting from a last $(N-a)^{th}$ symbol of the first time domain resource. The terminal device does not send or receive the first-type signal the following N symbols starting from the last $(N-a)^{th}$ symbol of the first time domain resource.

Figure 10B:
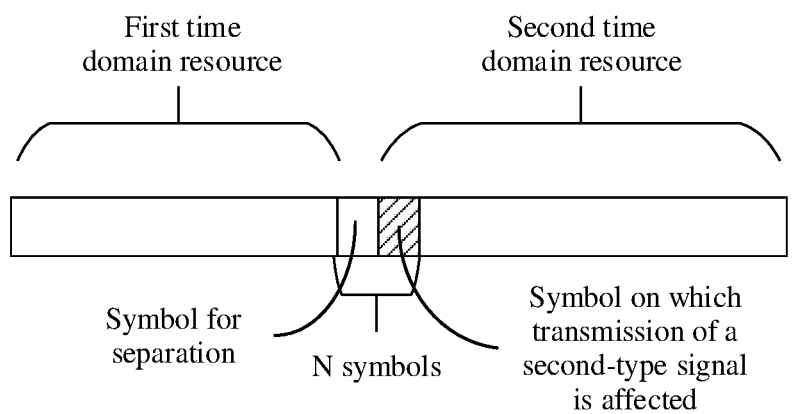
FIG. 10b is a tenth schematic diagram of locations of N time domain units according to an embodiment.

For another example, as shown in FIG. 10b, the first time domain resource is before the second time domain resource, and the N time domain units occupy some symbols of the second time domain resource. In this case, the second-type signal is not mapped to the following N symbols starting from a first symbol of the second time domain resource. The terminal device does not send or receive the second-type signal on the following N symbols starting from the first symbol of the second time domain resource.

Based on the foregoing method embodiments, including the embodiment in FIG. 3, the embodiment in FIG. 7, and the foregoing optional embodiments, the following provides explanations of concepts and optional implementations involved in some embodiments.

Optionally, a unit of the first time domain resource may be a symbol, a slot, a subframe, or any time unit. For example, the first time domain resource may be one or more consecutive symbols, or may be one or more consecutive slots, or may be one or more consecutive subframes. Similarly, a unit of the second time domain resource may be a symbol, a slot, a subframe, or any time unit. For example, the second time domain resource may be one or more consecutive symbols, or may be one or more consecutive slots, or may be one or more consecutive subframes.

The unit of the first time domain resource and the unit of the second time domain resource may be the same or different, and a time domain length of the first time domain resource and a time domain length of the second time domain resource may be the same or different. For example, the first time domain resource is three consecutive symbols, and the second time domain resource is one symbol. For another example, both the first time domain resource and the second time domain resource are one symbol.

The first time domain resource and the second time domain resource may be two time domain resources adjacent in time domain. For example, the first time domain resource and the second time domain resource may be two symbols adjacent in time domain. Alternatively, no signal is transmitted on a time domain resource between the first time domain resource and the second time domain resource, or another signal that affects beam configuration switching is not transmitted on a time domain resource between the first time domain resource and the second time domain resource.

In the embodiments, a beam configuration may be represented by using a TCI state. For example, when the network device indicates that the first beam configuration is different from the second beam configuration, the terminal device may determine, based on whether values of TCI states of the first beam configuration and the second beam configuration are the same, whether the first beam configuration is the same as the second beam configuration. The first-type signal or the first beam configuration corresponds to a first TCI state, and the second-type signal or the second beam configuration corresponds to a second TCI state. The terminal device determines, based on a difference between the first TCI state and the second TCI state, that the first beam configuration is different from the second beam configuration. Determining whether the two TCI states are the same is to determine whether the two TCI states have a QCL relationship. For example, that the first beam configuration and the second beam configuration are different means that the first TCI state and the second TCI state do not have a QCL relationship.

The following describes a possible implementation of how to determine a value of N. The value of N may be specified in a protocol, or may be notified by the network device to the terminal device. The value of N may be determined based on any one or more of the following information: a beam configuration switching delay, an SCS, a length of a symbol, or a length of a CP of a symbol. For example, a 960 kHz SCS is used for signal receiving and sending, the length of the CP of the 960 kHz SCS is about 72.5 ns. A maximum value of beam configuration switching duration between the terminal device and the network device is 100 ns, and 100 ns is greater than a length of 72.5 ns of a CP of one symbol. The value of N may be a value greater than or equal to 1, and a unit of the value of N is a symbol. For example, the value of N is 1, such as one symbol.

To implement functions in the method provided in the foregoing embodiments, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraint conditions of the solutions of the embodiments.

Figure 11:
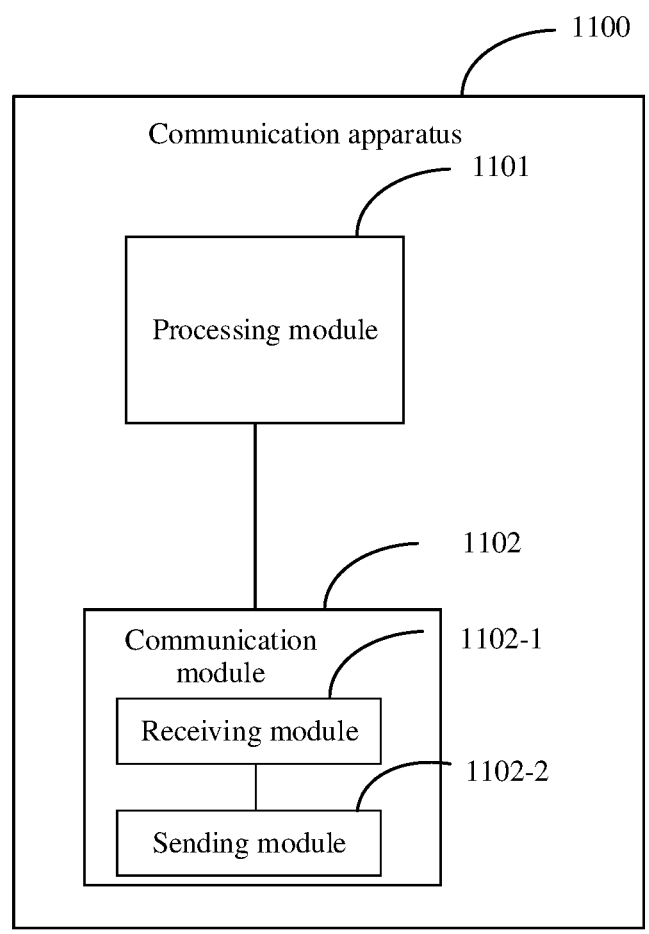
FIG. 11 is a first schematic diagram of a structure of a communication apparatus according to an embodiment.

As shown in FIG. 11, based on a same concept, an embodiment further provides a communication apparatus 1100. The communication apparatus 1100 may be a terminal device or a network device, an apparatus in a terminal device or a network device, or an apparatus that can be used together with a terminal device or a network device. In an implementation, the communication apparatus 1100 may include modules in a one-to-one correspondence for performing the methods/operations/steps/actions performed by the terminal device or the network device in the foregoing method embodiments. The modules may be implemented by a hardware circuit, software, or a combination of a hardware circuit and software. In an implementation, the communication apparatus may include a processing module 1101 and a communication module 1102. The processing module 1101 is configured to invoke the communication module 1102 to perform a receiving function and/or a sending function. Further, the communication module 1102 may also be referred to as a transceiver module, and may include a receiving module 1102-1 and a sending module 1102-2. The receiving module is configured to perform a receiving operation in the method embodiment, and the sending module is configured to perform a sending operation in the method embodiment. In this embodiment, that the processing module performs the sending or receiving operation by using the communication module may be understood as follows: The processing module delivers an instruction to the communication module, and the communication module performs the sending or receiving operation, or the processing module indicates the communication module to perform the sending or receiving operation.

In an embodiment, the communication apparatus is configured to perform a method performed by a terminal device. Details are as follows:

The receiving module 1102-1 is configured to receive first information from a network device, where the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal.

The receiving module 1102-1 is configured to receive a signal based on the first information. Alternatively, the sending module 1102-2 is configured to send a signal based on the first information. The terminal device does not expect the second-type signal to be carried on N time domain units before and/or after the first time domain resource, where N is a positive integer.

The receiving module 1102-1 is further configured to perform another receiving step or operation performed by the terminal device in the method embodiment in FIG. 3. The sending module 1102-2 is further configured to perform another sending step or operation performed by the terminal device in the method embodiment in FIG. 3. The processing module 1101 may be further configured to perform another corresponding step or operation that is performed by the terminal device in the method embodiment in FIG. 3 and that is other than receiving and sending. Details are not described herein again.

In another embodiment, the communication apparatus is configured to perform a method performed by a terminal device. Details are as follows:

The receiving module 1102-1 is configured to receive third information from a network device, where the third information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal.

The sending module 1102-2 is configured to send a signal based on the third information. Alternatively, the receiving module 1102-1 is configured to send a signal based on the third information. The first-type signal is sent or received on the first time domain resource, and the second-type signal is not sent or received on N time domain units before and/or after the first time domain resource.

The receiving module 1102-1 is further configured to perform another receiving step or operation performed by the terminal device in the method embodiment in FIG. 7. The sending module 1102-2 is further configured to perform another sending step or operation performed by the terminal device in the method embodiment in FIG. 7. The processing module 1101 may be further configured to perform another corresponding step or operation that is performed by the terminal device in the method embodiment in FIG. 7 and that is other than receiving and sending. Details are not described herein again.

In an embodiment, the communication apparatus is configured to perform a method performed by a network device. Details are as follows:

The processing module 1101 is configured to determine first information based on a constraint condition, where the first information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal; and the constraint condition is that there are N time domain units between the second time domain resource and the first time domain resource, where N is a positive integer.

The communication module 1102 is configured to send the first information to a terminal device.

The communication module 1102 is further configured to perform another receiving or sending step or operation performed by the terminal device in the method embodiment in FIG. 3. The processing module 1101 may be further configured to perform another corresponding step or operation that is performed by the network device in the method embodiment in FIG. 3 and that is other than receiving and sending. Details are not described herein again.

In another embodiment, the communication apparatus is configured to perform a method performed by a network device. Details are as follows:

The processing module 1101 is configured to map a signal in a mapping manner based on a specified condition. The specified condition includes: a first time domain resource is used to map a first-type signal, a second time domain resource is used to map a second-type signal, and a first beam configuration of the first-type signal is different from a second beam configuration of the second-type signal. The mapping manner includes: mapping the first-type signal to the first time domain resource, and skipping mapping the second-type signal to N time domain units before and/or after the first time domain resource.

The sending module 1102-2 is configured to send a mapped signal to a terminal device. Alternatively, the receiving module 1102-1 is configured to receive a signal from a terminal device based on a mapping manner.

The receiving module 1102-1 is further configured to perform another receiving step or operation performed by the network device in the method embodiment in FIG. 7. The sending module 1102-2 is further configured to perform another sending step or operation performed by the network device in the method embodiment in FIG. 7. The processing module 1101 may be further configured to perform another corresponding step or operation that is performed by the network device in the method embodiment in FIG. 7 and that is other than receiving and sending. Details are not described herein again.

In the embodiments, division into modules can be done as an example, and can be merely logical function division. In an actual implementation, there may be another division manner. In addition, functional modules in embodiments may be integrated into one processor, or each of the modules may exist alone physically, or two or more modules may be integrated into one module. The integrated module may be implemented in a form of hardware, or may be implemented in a form of a software functional module.

Figure 12:
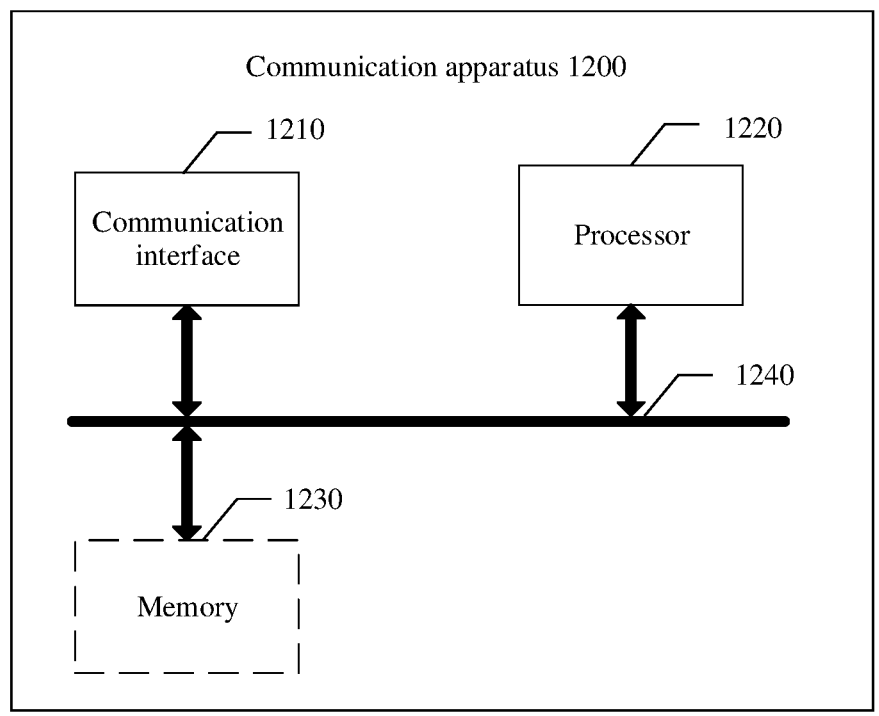
FIG. 12 is a second schematic diagram of a structure of a communication apparatus according to an embodiment.

FIG. 12 shows a communication apparatus 1200 according to an embodiment. The communication apparatus 1200 is configured to implement functions of the terminal device or the network device in the foregoing method. When implementing functions of the network device, the communication apparatus may be a network device, an apparatus in a network device, or an apparatus that can be used together with a network device. When implementing functions of the terminal device, the communication apparatus may be a terminal device, an apparatus in a terminal device, or an apparatus that can be used together with a terminal device. The communication apparatus may be a chip system. In this embodiment, the chip system may include a chip, or may include a chip and another discrete component. The communication apparatus 1200 includes at least one processor 1220, configured to implement functions of the terminal device or the network device in the method provided in embodiments of this application. The communication apparatus 1200 may further include a communication interface 1210. In this embodiment, the communication interface may be a transceiver, a circuit, a bus, a module, or a communication interface of another type, and is configured to communicate with another device by using a transmission medium. The transceiver may include a receiver and a transmitter. The receiver is configured to implement a receiving operation, and the transmitter is configured to implement a sending operation. When the communication apparatus is a chip system, the communication interface 1210 may include an input interface and an output interface. The input interface correspondingly performs a receiving operation, and the output interface correspondingly performs a sending operation. For example, the communication interface 1210 is used by an apparatus in the apparatus 1200 to communicate with the another device. For example, when the communication apparatus 1200 is a terminal device, the another device may be a network device. When the communication apparatus 1200 is a network device, the another apparatus may be a terminal device. The processor 1220 receives and sends data through the communication interface 1210, and is configured to implement the methods in the foregoing method embodiments.

For example, in an embodiment, when a function of a terminal device is implemented, the communication interface 1210 is configured to receive first information from a network device, where the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal. The communication interface 1210 is further configured to send or receive a signal based on the first information. The terminal device does not expect the second-type signal to be carried on N time domain units before and/or after the first time domain resource, where N is a positive integer. The communication interface 1210 is further configured to perform another receiving or sending step or operation performed by the terminal device in the method embodiment in FIG. 3. The processor 1220 may be further configured to perform another corresponding step or operation that is performed by the terminal device in the method embodiment in FIG. 3 and that is other than receiving and sending. Details are not described herein again.

In another embodiment, when a function of a terminal device is implemented, the communication interface 1210 is configured to receive first information from a network device, where the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal. The communication interface 1210 is further configured to send or receive a signal based on the first information. The communication interface 1210 is further configured to perform another receiving or sending step or operation performed by the terminal device in the method embodiment in FIG. 7. The processor 1220 may be further configured to perform another corresponding step or operation that is performed by the terminal device in the method embodiment in FIG. 7 and that is other than receiving and sending. Details are not described herein again.

In an embodiment, when being configured to perform a method performed by a network device, the processor 1220 is configured to determine first information based on a constraint condition, where the first information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal; and the constraint condition is that there are N time domain units between the second time domain resource and the first time domain resource, where N is a positive integer, and the communication interface 1210 is configured to send the first information to a terminal device.

The communication interface 1210 is further configured to perform another receiving or sending step or operation performed by the network device in the method embodiment in FIG. 3. The processor 1220 may be further configured to perform another corresponding step or operation that is performed by the network device in the method embodiment in FIG. 3 and that is other than receiving and sending. Details are not described herein again.

In another embodiment, when being configured to perform a method performed by a network device, the processor 1220 is configured to map a signal in a mapping manner based on a specified condition. The specified condition includes: a first time domain resource is used to map a first-type signal, a second time domain resource is used to map a second-type signal, and a first beam configuration of the first-type signal is different from a second beam configuration of the second-type signal. The mapping manner includes: mapping the first-type signal to the first time domain resource, and skipping mapping the second-type signal to N time domain units before and/or after the first time domain resource.

The communication interface 1210 is configured to send a mapped signal to a terminal device. Alternatively, the communication interface 1210 is configured to receive a signal from a terminal device in a mapping manner.

The communication interface 1210 is further configured to perform another receiving or sending step or operation performed by the network device in the method embodiment in FIG. 7. The processor 1220 may be further configured to perform another corresponding step or operation that is performed by the network device in the method embodiment in FIG. 7 and that is other than receiving and sending. Details are not described herein again.

The communication apparatus 1200 may further include at least one memory 1230, configured to store program instructions and/or data. The memory 1230 is coupled to the processor 1220. The coupling in this embodiment may be an indirect coupling or a communication connection between apparatuses, units, or modules in an electrical form, a mechanical form, or another form, and is used for information exchange between the apparatuses, the units, or the modules. The processor 1220 may operate in cooperation with the memory 1230. The processor 1220 may execute the program instructions stored in the memory 1230. At least one of the at least one memory may be included in the processor.

In this embodiment, a specific connection medium between the communication interface 1210, the processor 1220, and the memory 1230 is not limited. In this embodiment, the memory 1230, the processor 1220, and the communication interface 1210 are connected through a bus 1240 in FIG. 12, and the bus is represented by a thick line in FIG. 12. A connection manner between other components is only schematically described, and is not limited thereto. The bus may be classified into an address bus, a data bus, a control bus, or the like. For ease of representation, only one thick line is used to represent the bus in FIG. 12, but this does not mean that there is only one bus or only one type of bus.

When the communication apparatus 1100 and the communication apparatus 1200 are chips or chip systems, the communication module 1102 and the communication interface 1210 may output or receive baseband signals. When the communication apparatus 1100 and the communication apparatus 1200 are devices, the communication module 1102 and the communication interface 1210 may output or receive radio frequency signals. In this embodiment, the processor may be a general-purpose processor, a digital signal processor, an application-specific integrated circuit, a logic circuit, a field programmable gate array or another programmable logic device, a discrete gate or a transistor logic device, or a discrete hardware component, and may implement or perform the methods, steps, and logical block diagrams in the embodiments. The general-purpose processor may be a microprocessor or any conventional processor or the like. The steps of the methods with reference to the embodiments may be directly performed by a hardware processor, or may be performed by using a combination of hardware and software modules in the processor.

In the embodiments, the memory 1230 may be a non-volatile memory, for example, a hard disk drive (HDD) or a solid-state drive (SSD), or may be a volatile memory, for example, a random access memory (RAM). The memory is any other medium that can be used to carry or store expected program code in a form of an instruction or a data structure and that can be accessed by a computer, but is not limited thereto. The memory in embodiments may alternatively be a circuit or any other apparatus that can implement a storage function, and is configured to store the program instructions and/or the data.

Some or all of the operations and functions that are performed by the terminal device and that are described in the foregoing method embodiments, or some or all of the operations and functions that are performed by the network device and that are described in the foregoing method embodiments may be completed by using a chip or an integrated circuit.

To implement the functions of the communication apparatus in FIG. 11 or FIG. 12, an embodiment further provides a chip, including a processor, configured to support the communication apparatus in implementing the functions of the terminal device or the network device in the foregoing method embodiments. In a possible implementation, the chip is connected to a memory or the chip includes a memory, and the memory is configured to store program instructions and data that are necessary for the communication apparatus.

An embodiment provides a non-transitory computer-readable storage medium storing a computer program. The computer program includes instructions used to perform the foregoing method embodiments.

An embodiment provides a computer program product including instructions. When the computer program product runs on a computer, the foregoing method embodiments are implemented.

An embodiment provides a computer program. When the computer program is run on a computer, the foregoing method embodiments are implemented.

Persons skilled in the art should understand that embodiments may be provided as a method, a system, or a computer program product. Therefore, the embodiments may be in a form of a hardware-only embodiment, a software-only embodiment, or an embodiment with a combination of software and hardware. Moreover, the embodiments may use a form of a computer program product that is implemented on one or more computer-usable storage media (including, but not limited to, a disk memory, a CD-ROM, an optical memory, and the like) that include computer-usable program code.

The embodiments are described with reference to the flowcharts and/or block diagrams of the method, the device (the system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that instructions executed by the computer or the processor of the another programmable data processing device generate an apparatus for implementing a specific function in one or more processes in the flowcharts and/or in one or more blocks in the block diagrams.

These computer program instructions may alternatively be stored in a non-transitory computer-readable memory that can indicate a computer or another programmable data processing device to work in a specific manner, so that the instructions stored in the non-transitory computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

Although some embodiments have been described, persons skilled in the art can make changes and modifications to these embodiments once they learn the basic concepts. Therefore, the embodiments are intended to be construed as to cover the these embodiments and all changes and modifications falling within their scope.

It may further be appreciated that persons skilled in the art can make various modifications and variations to embodiments without departing from the spirit and scope of the embodiments. In this way, is the embodiments are intended to cover these modifications and variations.

What is claimed is:

1. A signal transmission method, comprising:
receiving, by a terminal device, first information from a network device, wherein the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal; and
sending or receiving, by the terminal device, a signal based on the first information, wherein the second-type signal is carried on a time domain resource other than N time domain units before and/or after the first time domain resource, wherein N is a positive integer.

2. The method according to claim 1, wherein sending or receiving, by the terminal device, of the signal based on the first information comprises:
sending or receiving, by the terminal device, a third-type signal on the N time domain units, wherein a third beam configuration of the third-type signal is the same as the first beam configuration.

3. The method according to claim 1, wherein the terminal device carries the second-type signal on a time domain resource other than a resource interval in which the first time domain resource is located.

4. The method according to claim 1, wherein if the first time domain resource is before the second time domain resource, and the second-type signal is carried on a time domain resource other than N time domain units that are after the first time domain resource and that are close to the first time domain resource; or
when the first time domain resource is after the second time domain resource, the second-type signal is carried on a time domain resource other than N time domain units that are before the first time domain resource and that are close to the first time domain resource; or
when there is an overlapping time domain unit between the first time domain resource and the second time domain resource, and the second time domain resource comprises the first time domain resource, the second-type signal is carried on a time domain resource other than N time domain units that are before and after the first time domain resource and that are close to the first time domain resource.

5. The method according to claim 1, further comprising:
when there is an overlapping time domain unit between the first time domain resource and the second time domain resource, and the first time domain resource comprises the second time domain resource, skipping, by the terminal device, sending or receiving the second-type signal on the second time domain resource.

6. A signal transmission method, comprising:
determining, by a network device, first information based on a constraint condition, wherein the first information is used to schedule a first time domain resource and a second time domain resource, the first time domain resource is used to map a first-type signal, the second time domain resource is used to map a second-type signal, and a first beam configuration of the first-type signal is different from a second beam configuration of the second-type signal; and the constraint condition is that there are N time domain units between the second time domain resource and the first time domain resource, wherein N is a positive integer; and
sending, by the network device, the first information to a terminal device.

7. The method according to claim 6, wherein a value of N is specified in a protocol, or a value of N is determined based on any one or more of: a beam configuration switching delay, a subcarrier spacing (SCS), a length of a symbol, or a length of a cyclic prefix (CP) of a symbol.

8. The method according to claim 6, further comprising:
sending, by the network device, second information to the terminal device, wherein the second information indicates that a priority of the first-type signal is higher than a priority of the second-type signal.

9. The method according to claim 6, wherein a total length of the N time domain units is greater than or equal to the beam configuration switching delay.

10. A communication apparatus, comprising: a memory, configured to store instructions or data invoked by a processor, the memory is coupled to the processor, and, when executing the instructions or data stored in the memory, the apparatus is configured to:
schedule a communication module to communicate with another apparatus; and
receive first information from a network device, wherein the first information is used to schedule a first time domain resource and a second time domain resource, the first time domain resource is used to carry a first-type signal, the second time domain resource is used to carry a second-type signal, and a first beam configuration of the first-type signal is different from a second beam configuration of the second-type signal, and
send or receive a signal based on the first information, wherein the second-type signal is carried on a time domain resource other than N time domain units before and/or after the first time domain resource, wherein N is a positive integer.

11. The apparatus according to claim 10, wherein, when sending or receiving the signal based on the first information, the apparatus is further configured to:
send or receive a third-type signal on the N time domain units, wherein a third beam configuration of the third-type signal is the same as the first beam configuration.

12. The apparatus according to claim 10, wherein the second-type signal is carried on a time domain resource other than a resource interval in which the first time domain resource is located.

13. The apparatus according to claim 10, wherein when the first time domain resource is before the second time domain resource, the second-type signal is carried on a time domain resource other than N time domain units that are after the first time domain resource and that are close to the first time domain resource; or
when the first time domain resource is after the second time domain resource, the second-type signal is carried on a time domain resource other than N time domain units that are before the first time domain resource and that are close to the first time domain resource; or
when there is an overlapping time domain unit between the first time domain resource and the second time domain resource, and the second time domain resource comprises the first time domain resource, the second-type signal is carried on a time domain resource other than N time domain units that are before and after the first time domain resource and that are close to the first time domain resource.

14. The apparatus according to claim 10, wherein the apparatus is further configured to:
skip sending or receiving the second-type signal on the second time domain resource when there is an overlapping time domain unit between the first time domain resource and the second time domain resource, and the first time domain resource comprises the second time domain resource.

15. The apparatus according to claim 10, wherein the apparatus is further configured to:
send or receive the second-type signal at a location that is in the second time domain resource and that is other than time domain units occupied by the N time domain units when the second time domain resource overlaps the N time domain units.

* * * * *